US006719226B2

United States Patent
Rajewski

(10) Patent No.: US 6,719,226 B2
(45) Date of Patent: Apr. 13, 2004

(54) MOBILE PAPER SHREDDER SYSTEM

(76) Inventor: Max Ronald Rajewski, 6654 Elijah Rd., Wellpinit, WA (US) 99040

( * ) Notice: Subject to any disclaimer, the term of this patent is extended or adjusted under 35 U.S.C. 154(b) by 0 days.

(21) Appl. No.: 09/812,725

(22) Filed: Mar. 19, 2001

(65) Prior Publication Data

US 2002/0017577 A1 Feb. 14, 2002

Related U.S. Application Data

(60) Provisional application No. 60/190,403, filed on Mar. 17, 2000.

(51) Int. Cl.$^7$ .............................................. B02C 21/02
(52) U.S. Cl. ..................... 241/30; 241/101.741; 241/34
(58) Field of Search .............................. 241/30, 34, 73, 241/101.761, 101.74, 101.741, 101.742, 186.4, 60, 62, 101.76, 35

(56) References Cited

U.S. PATENT DOCUMENTS

| 1,224,960 A | | 5/1917 | Saecker |
|---|---|---|---|
| 2,828,082 A | * | 3/1958 | VanderVeen |
| 2,961,977 A | * | 11/1960 | Coleman |
| 4,018,392 A | | 4/1977 | Wagner |
| 4,134,554 A | | 1/1979 | Morlock ...................... 241/35 |
| 4,227,849 A | | 10/1980 | Worthington |
| 4,640,659 A | | 2/1987 | Parks |
| 4,645,018 A | | 2/1987 | Garbade et al. |
| 5,261,614 A | | 11/1993 | Schwelling |
| 5,375,782 A | | 12/1994 | Schwelling |
| 5,542,617 A | | 8/1996 | Rajewski ............. 241/101.761 |
| 5,871,162 A | | 2/1999 | Rajewski |
| 5,873,304 A | | 2/1999 | Ruf |

OTHER PUBLICATIONS

Brochure, "Solutions for All Your Shredding Needs," Allegheny Paper Shredders Corporation (2000).
Brochure, "On–Site Mobile Document Destruction—Seize the Opportunity," Shred–Tech.
Brochure, "Tornado Data Destruction Inc.—The Pioneers in High Volume Mobile Data Destruction," Tornada Data Destruction, Inc.
Website printout, "Shredfast Inc.—On–Site Mobile Shredders," Shredfast Inc. (Mar. 2000).

* cited by examiner

Primary Examiner—Mark Rosenbaum
(74) Attorney, Agent, or Firm—Sheridan Ross P.C.

(57) ABSTRACT

The present invention is a truck mounted mobile paper shredding system, with first and second rotary paper feed systems and a hammer mill paper shredder disposed between the feed systems. The feed systems and hammer mill are transversely mounted relative to the truck which, together with the relative positioning of the feed systems and hammer mill. provides increased paper processing speeds and a more efficient shredding operation. The invention further includes a monitoring system to prevent overfeed of the hammer mill and a low profile lift system which allows the truck to be more readily used in confined areas.

54 Claims, 14 Drawing Sheets

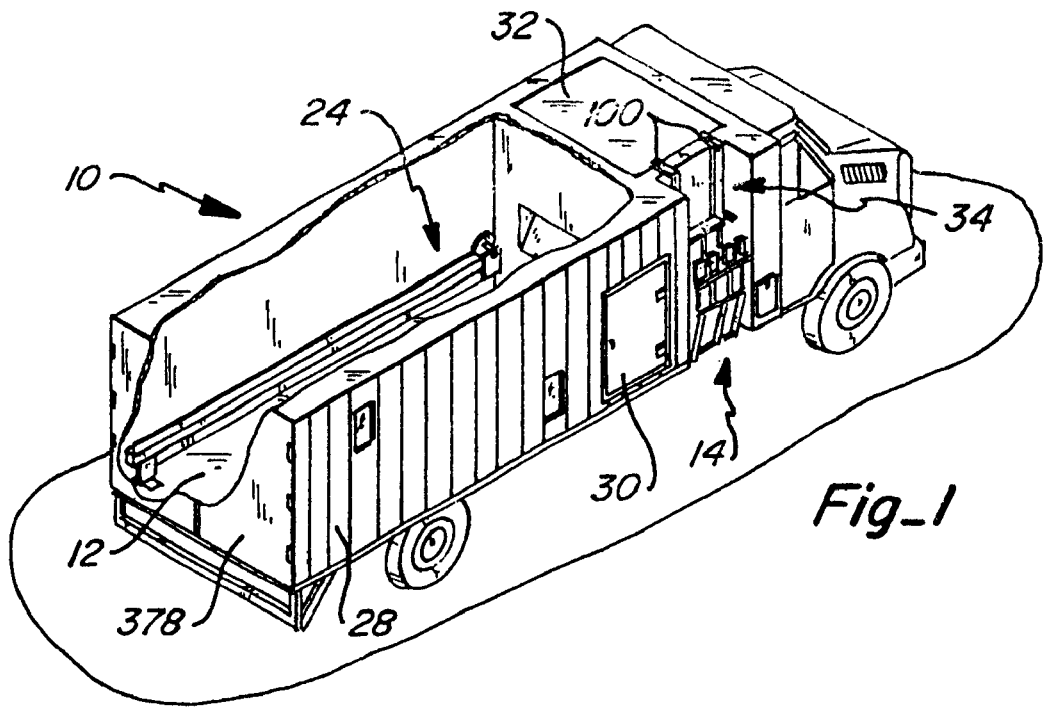
Fig_1
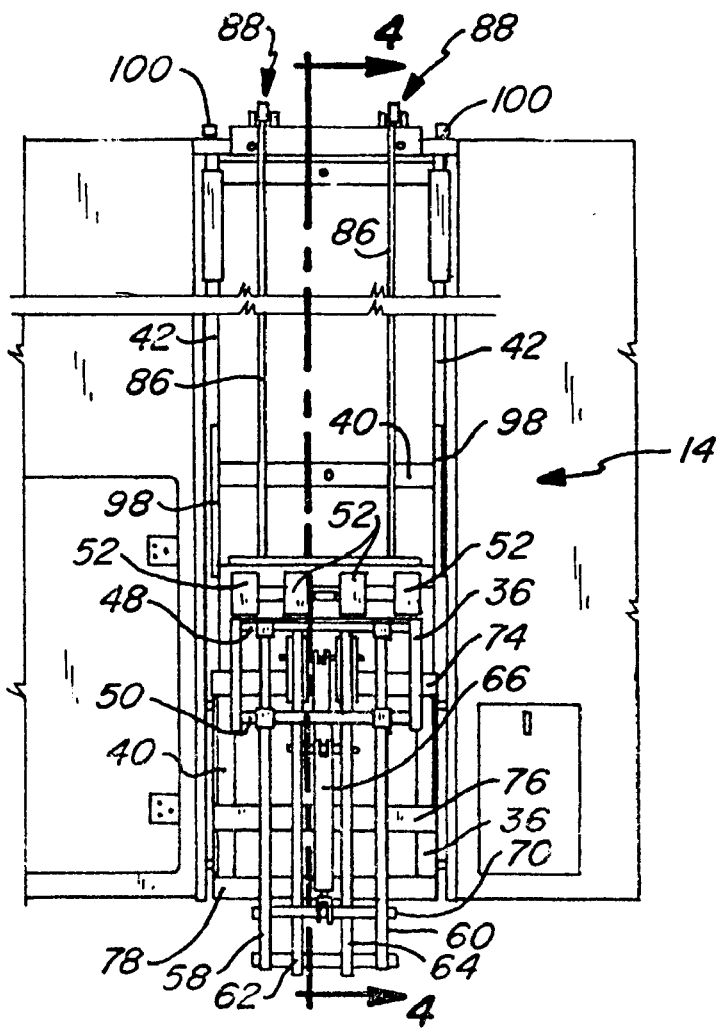
Fig_3

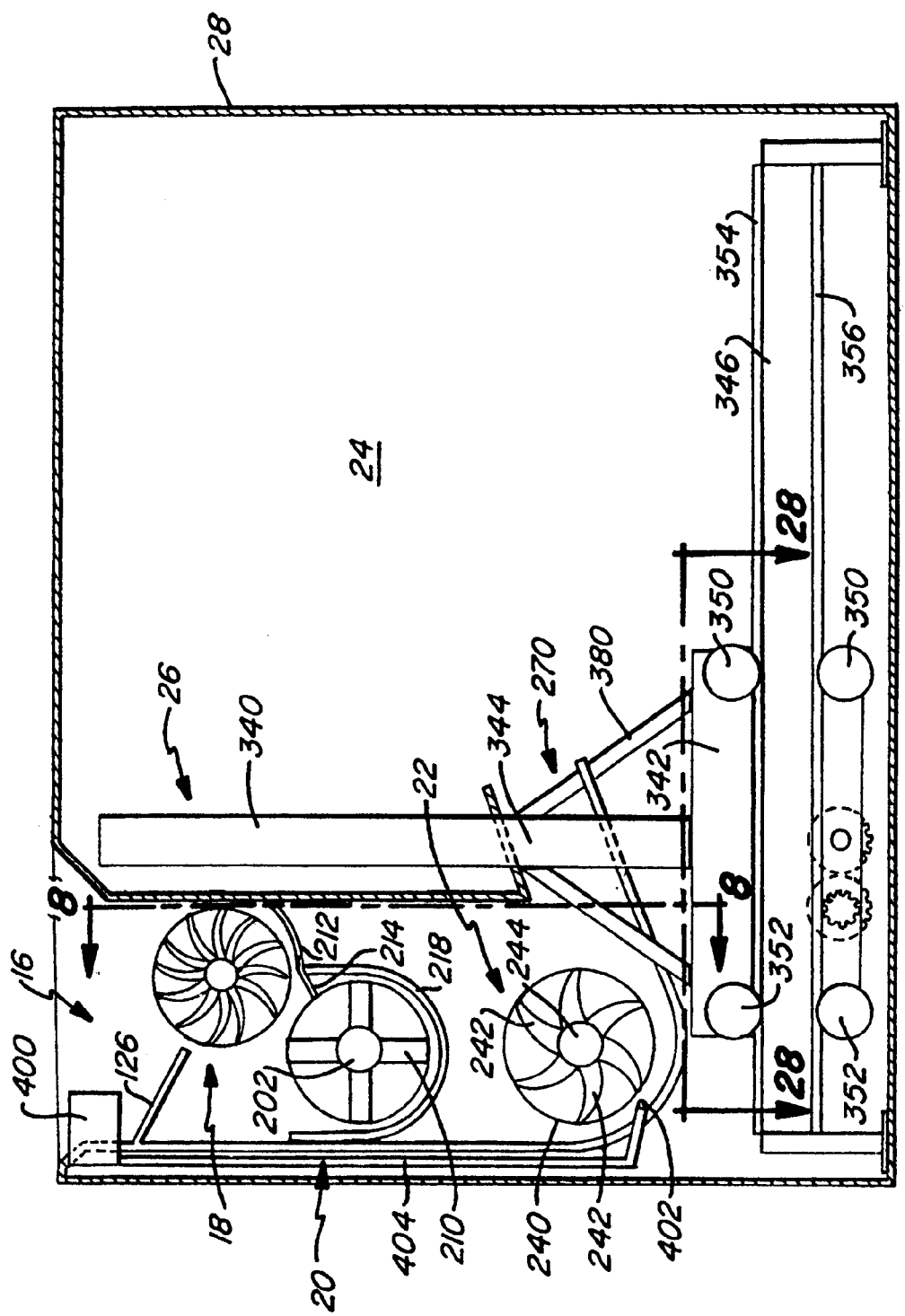
Fig_2

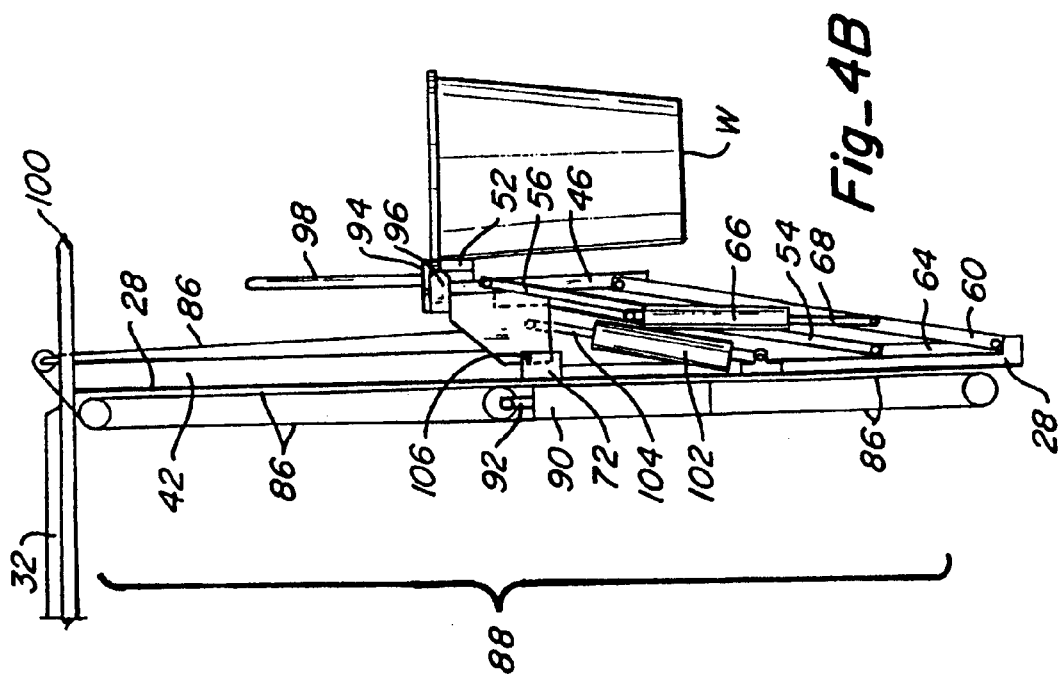
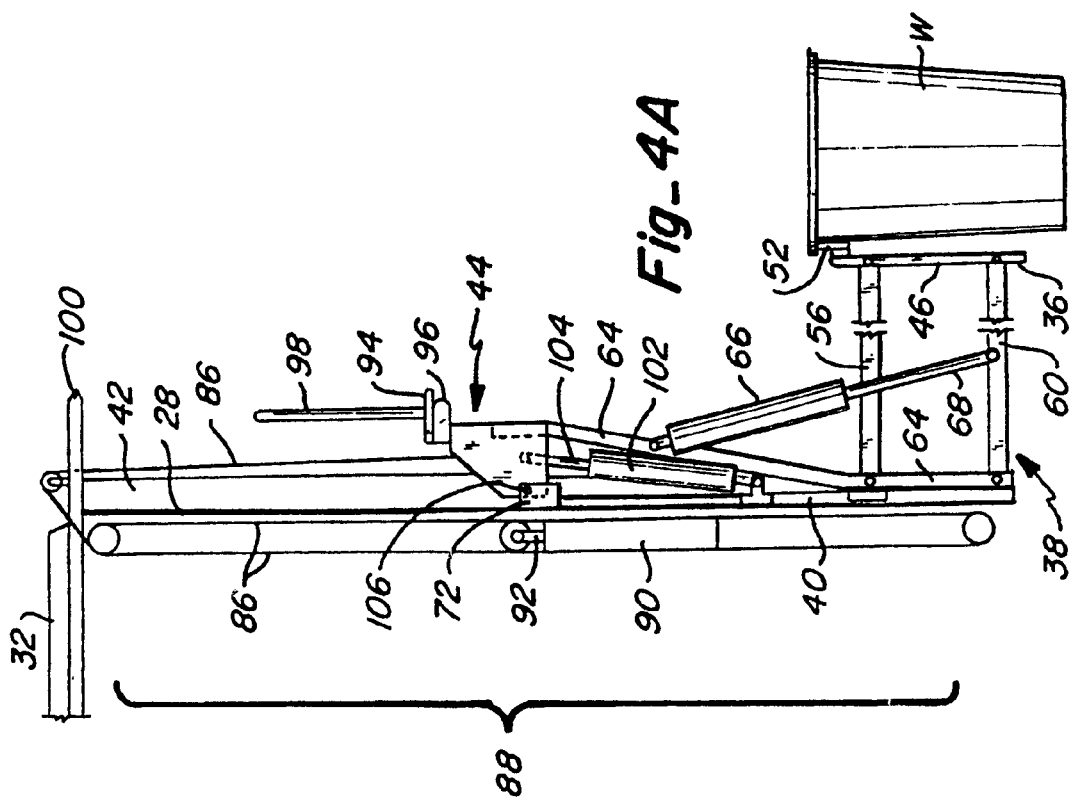

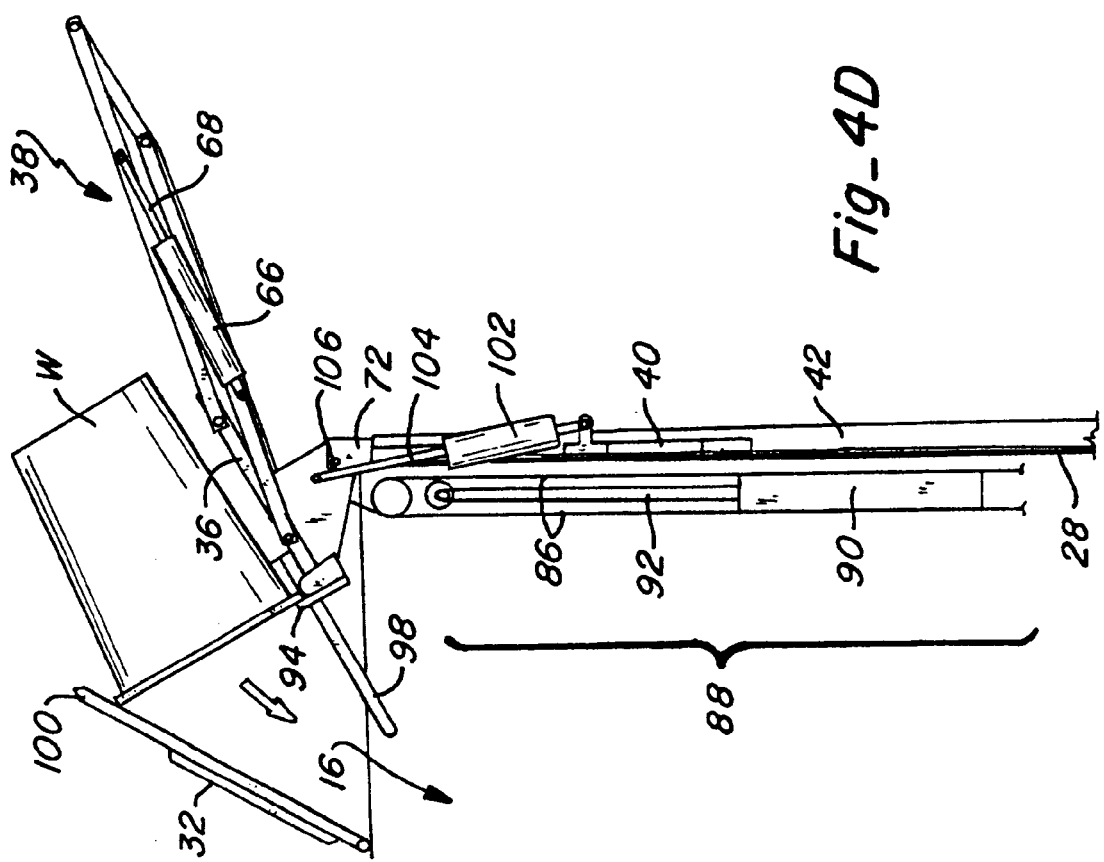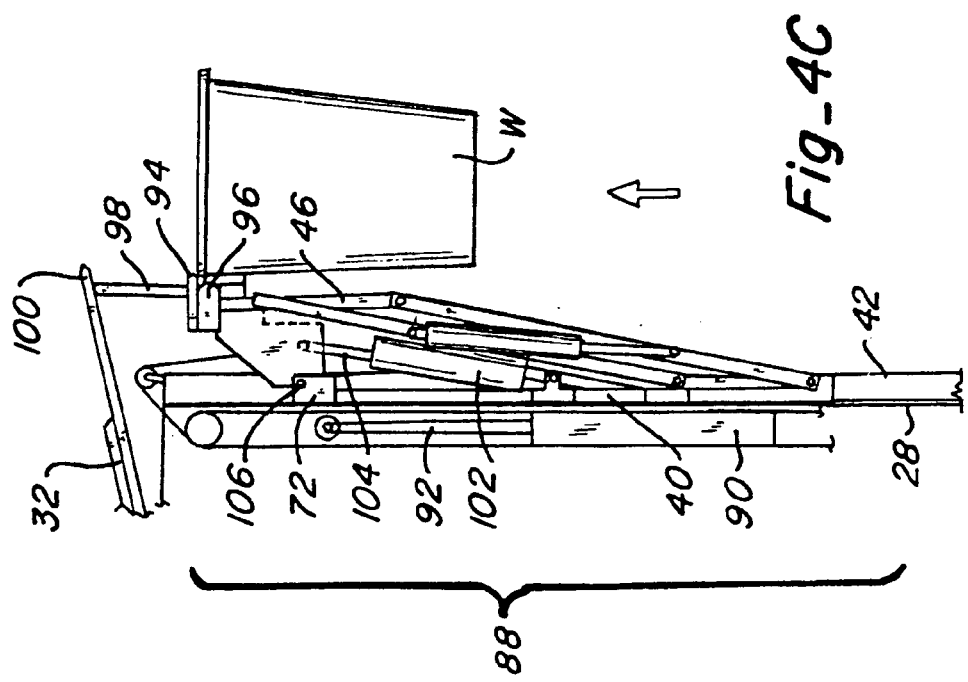

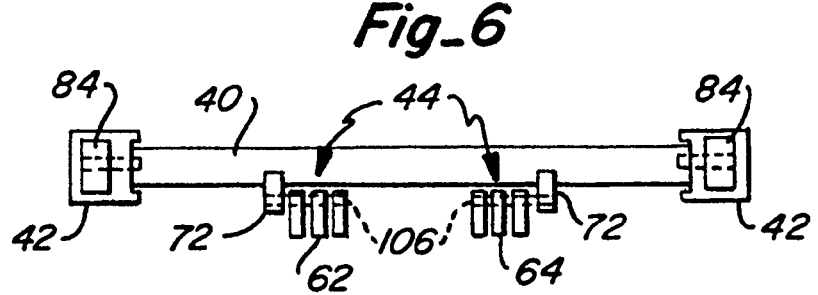
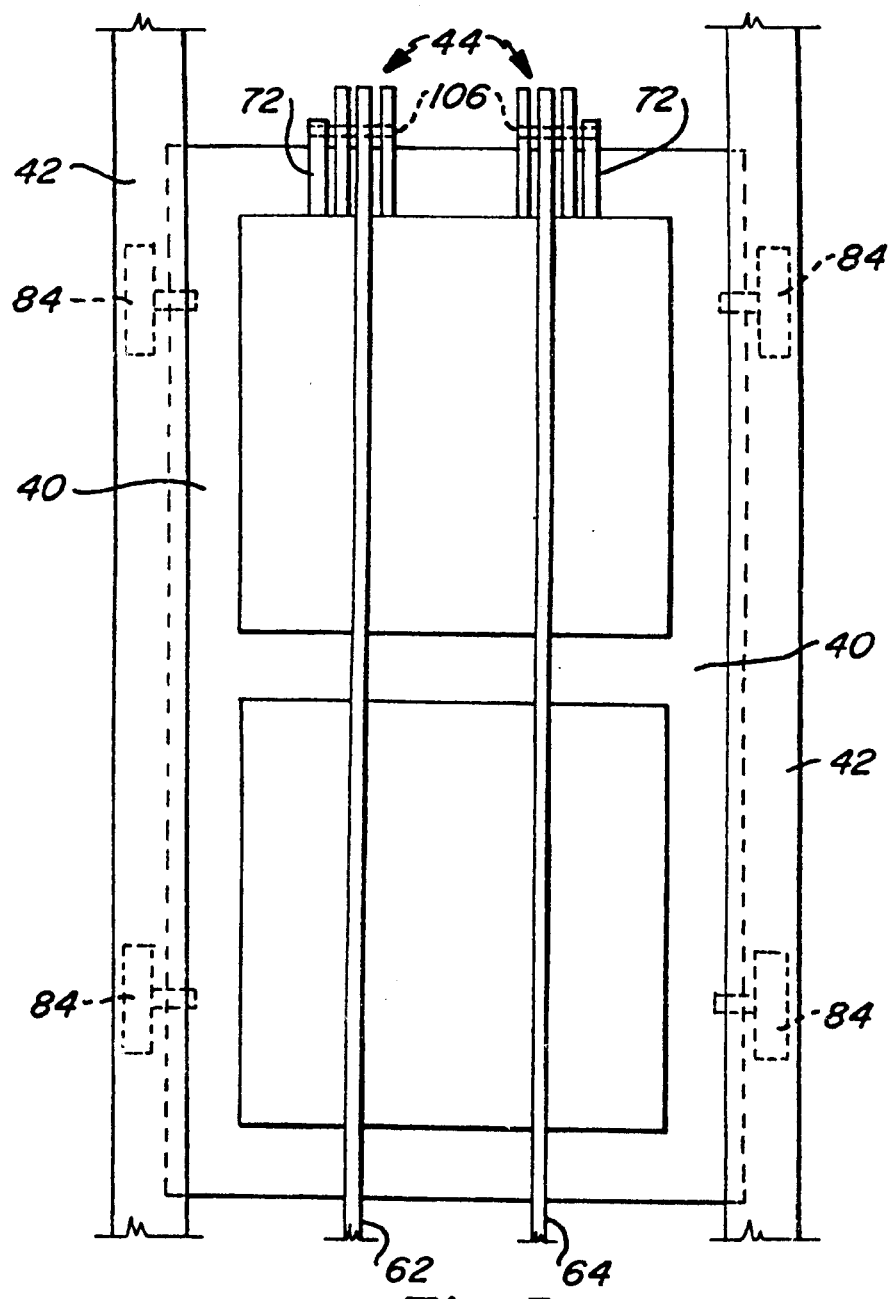

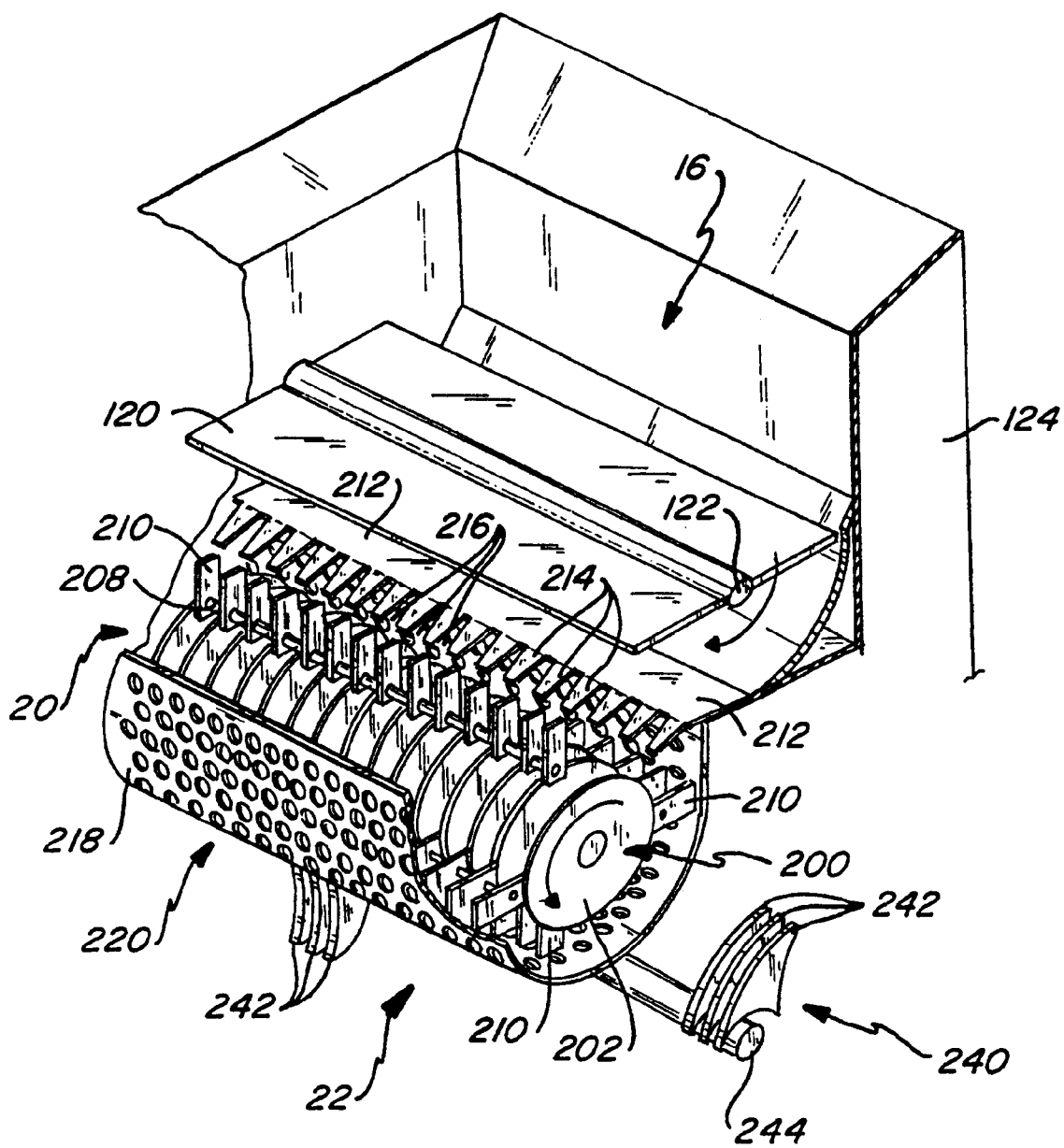
Fig_7

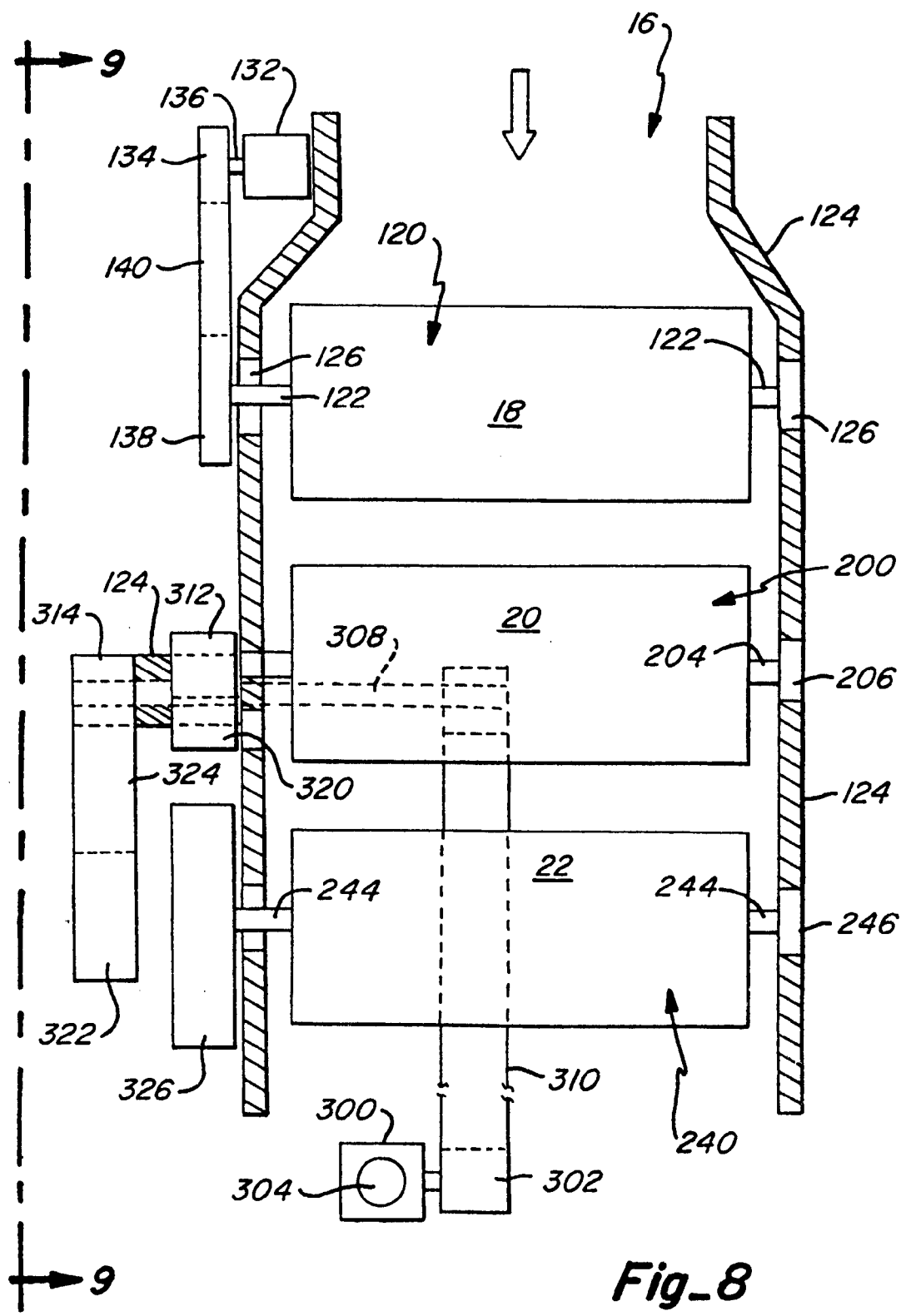
Fig_8

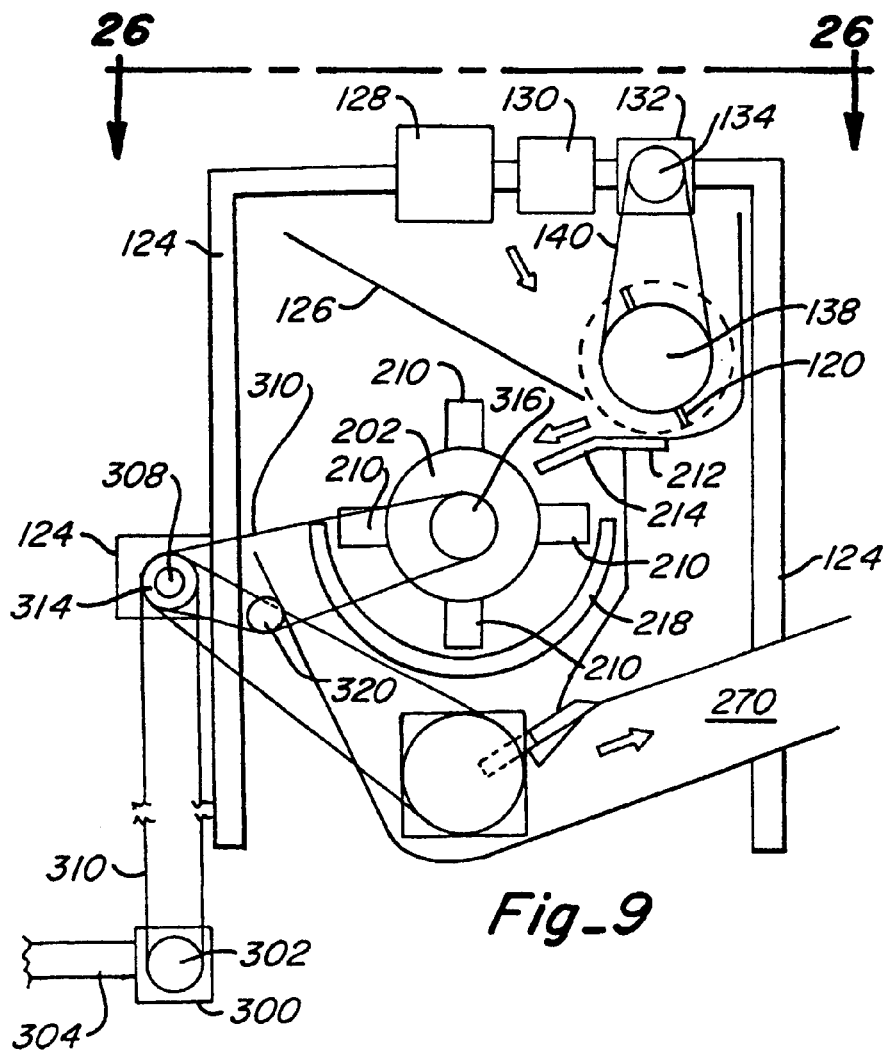
Fig_9
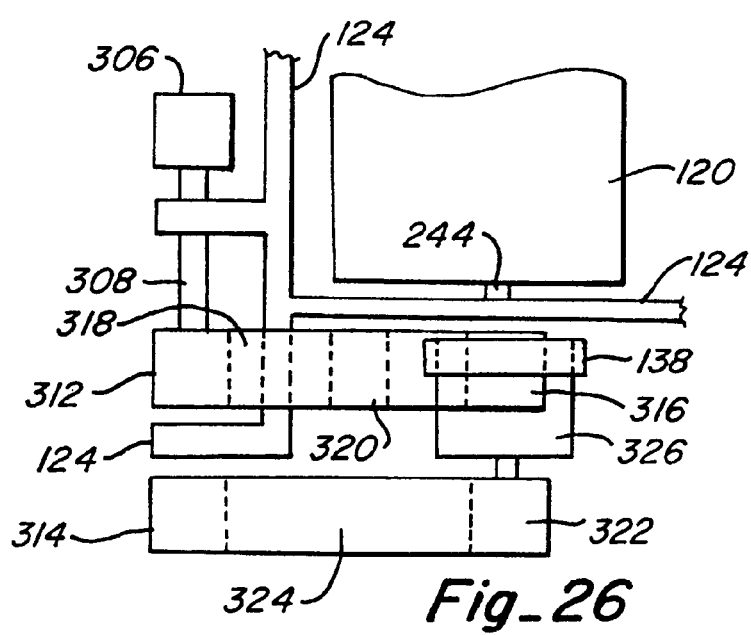
Fig_26

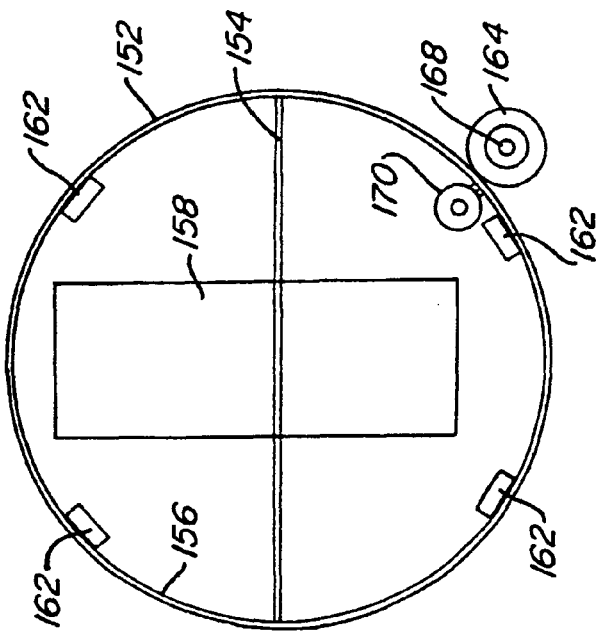
Fig_11
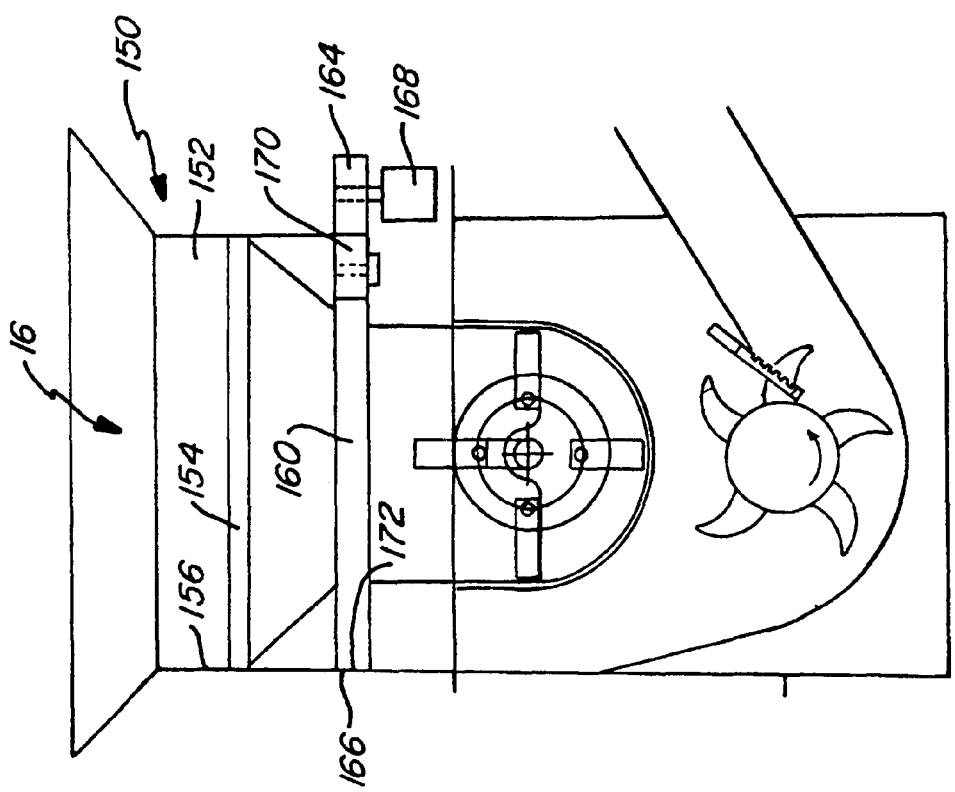
Fig_10

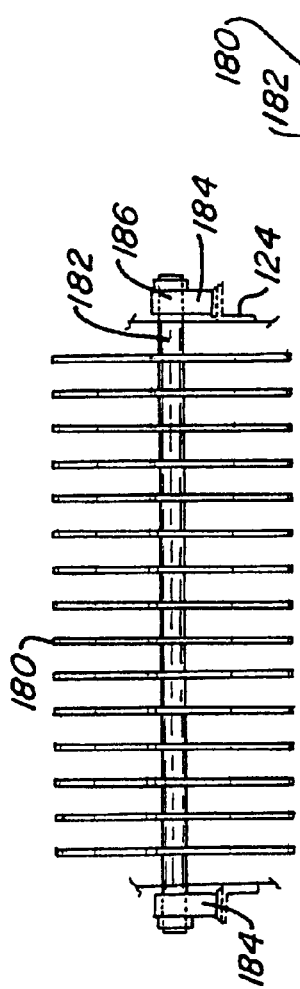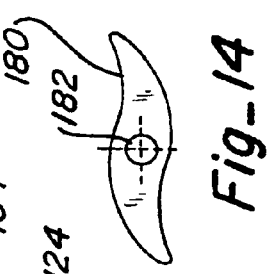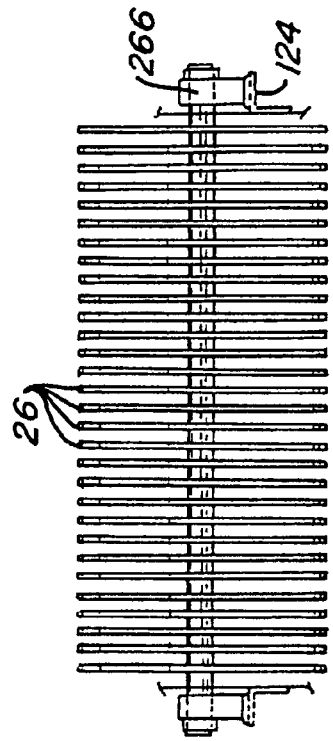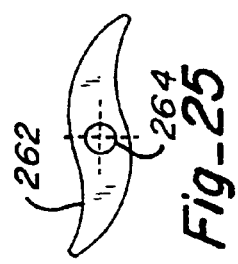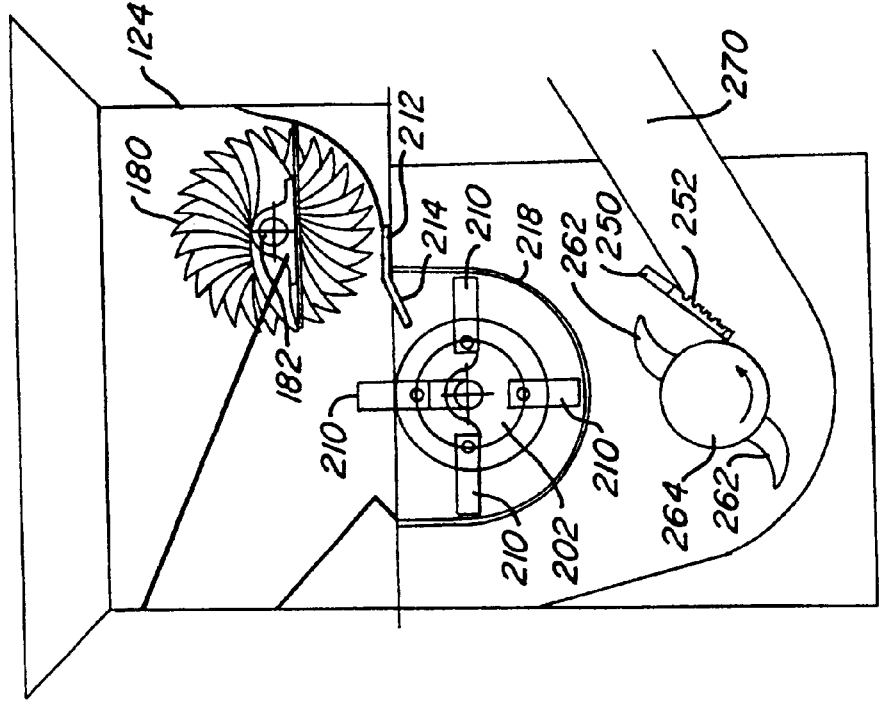

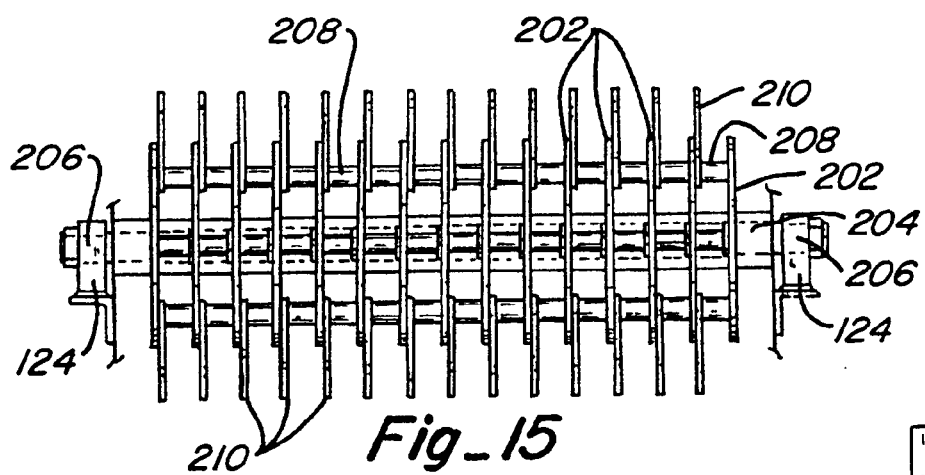
Fig_15
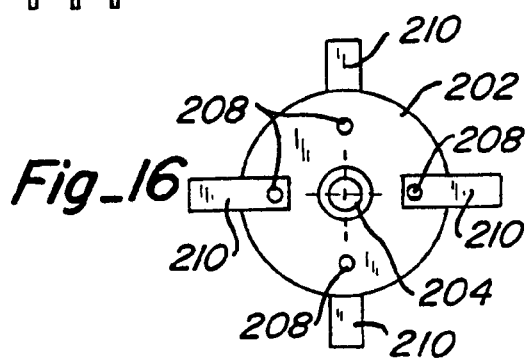
Fig_16
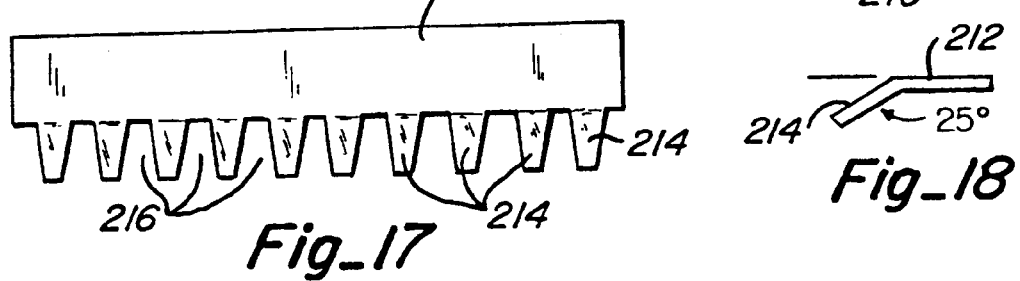
Fig_17  Fig_18
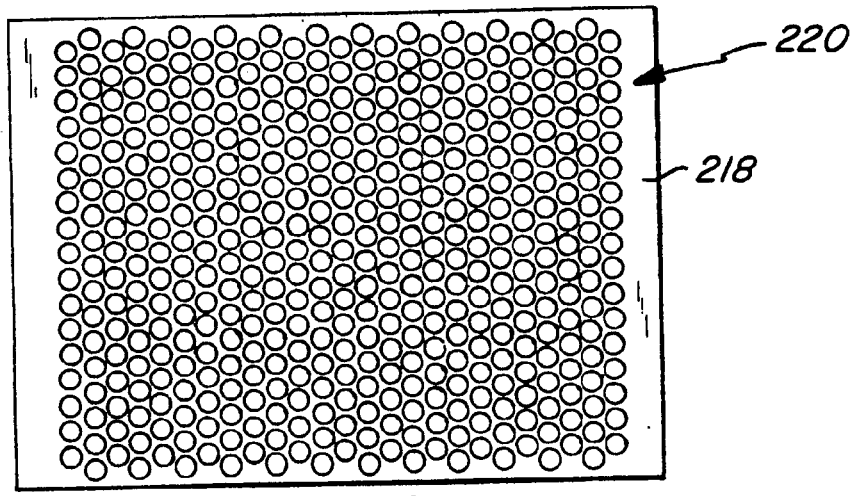
Fig_19

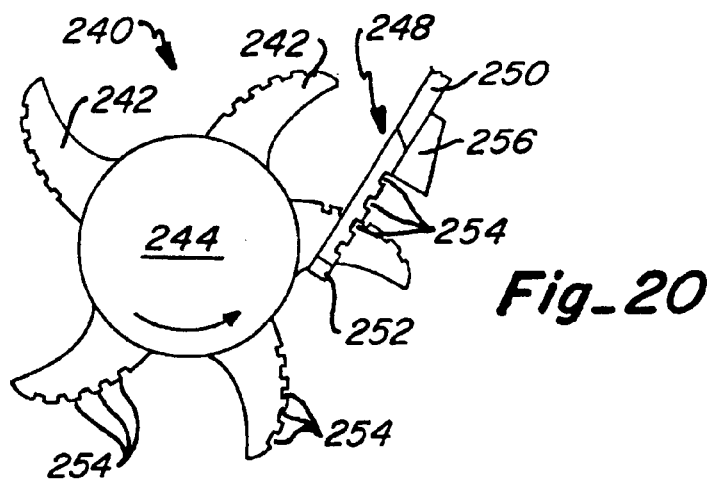
Fig_20
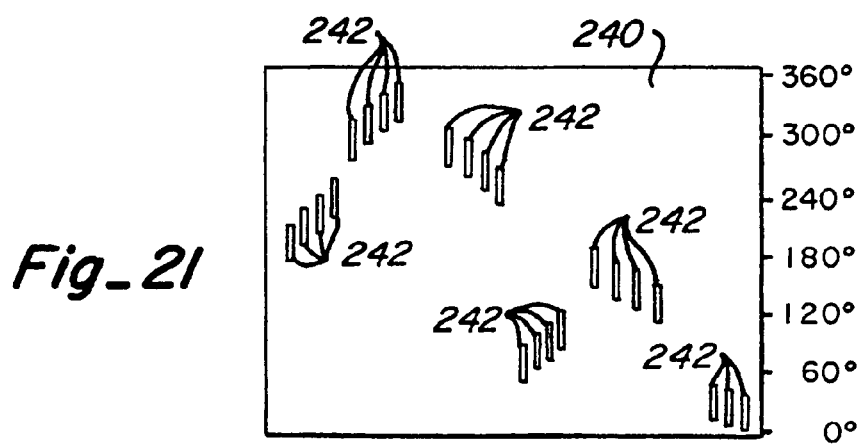
Fig_21
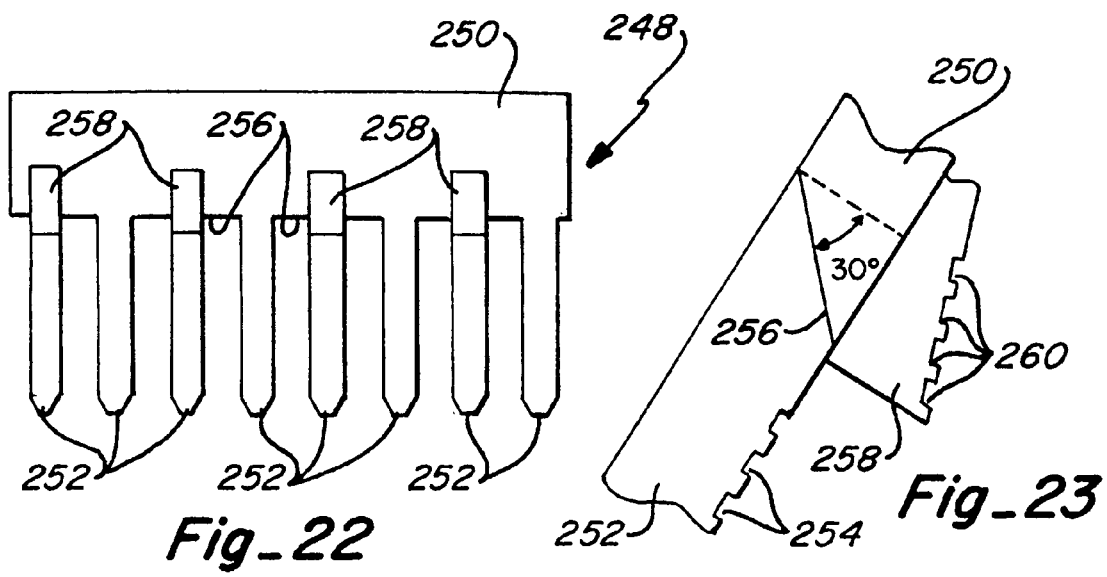
Fig_22
Fig_23

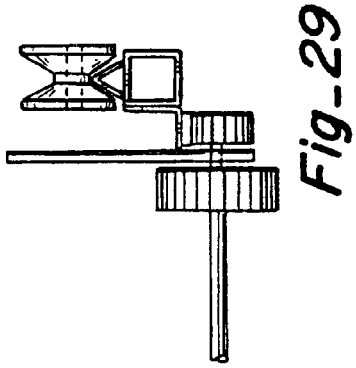
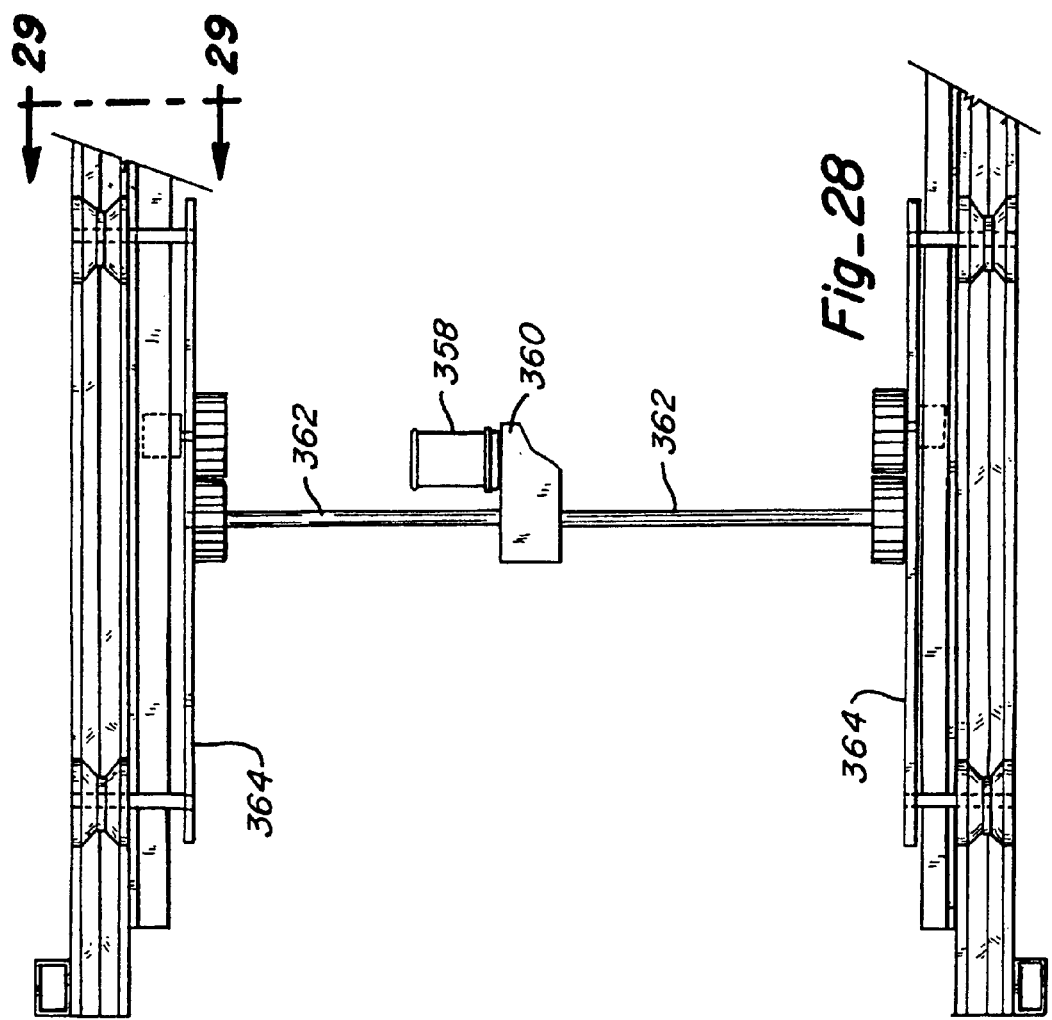

MOBILE PAPER SHREDDER SYSTEM

RELATED APPLICATIONS

The present application claims priority under 35 U.S.C. §119(e) from U.S. Provisional Patent Application Ser. No. 60/190,403, filed Mar. 17, 2000, which provisional application is incorporated herein by reference in its entirety.

FIELD OF THE INVENTION

This invention relates to a mobile paper shredding system. More particularly, this invention relates to methods and apparatus used in shredding large volumes of paper generated either by large businesses or multiple businesses located close together. It is primarily adapted for use in urban and suburban areas, although benefits of the system can be utilized at any location where there is a need for mobile paper shredding services.

BACKGROUND OF THE INVENTION

Truck-mounted paper shredding equipment is in common use today, primarily in urban environments. Typically, the shredding equipment is mounted on the bed of a truck which moves among office buildings to collect discarded office paper. This waste paper is fed into an opening or hopper of the shredding system, where it passes through a shredding apparatus, such as a hammer mill. Paper shredded by the hammer mill is then fed into a container typically located at the rear of the truck where it is stored until the container may be emptied. In this manner, discarded paper can be effectively compressed into a smaller volume of space for more efficient transportation to a municipal landfill or recycling center.

Problematic in the design of mobile paper shredders for use in an urban or suburban environment is the size and configuration of the equipment. Obviously, it is desirable for a shredding system to have a large storage capacity to reduce trips to the landfill or recycling center. It is also desirable to have a powerful shredding system to process waste paper as quickly as possible. However, these needs are often in conflict. With mobile shredding systems, large storage capacity reduces the space available for powerful shredding equipment and powerful shredding equipment typically reduces the available storage space for shredded paper. For example, in known mobile shredding systems, the paper feed and shredding equipment is mounted along the longitudinal axis of the truck bed, typically to allow for simple and direct power transfer from the drive train of the truck. Unfortunately, for a given size truck bed, the length of the shredding equipment directly affects the amount of available storage capacity for shredded paper. Increasing the length of the shredding equipment, to increase throughput of paper, directly decreases the amount of available storage.

Yet another problem with known mobile paper shredders is a lack of mobility in confined spaces. Indeed, in many large cities, buildings are separated by narrow alleys and loading docks, or other commercial receiving areas are located either in these alleys or, perhaps, underground garages. In either case, large trucks cannot easily maneuver into these confined spaces. As a result, the demand is great for smaller, more efficient configurations without sacrificing storage capacity. Besides the configuration and layout of the equipment, a further limiting factor on the ability of a mobile shredding system to operate in confined spaces is the lift system. In some known mobile shredding systems, the lift systems move waste paper containers through a fixed radius path away from the body of the truck until the waste paper container is positioned over an opening or hopper for the shredding system. Such lift systems require substantial lateral space around the perimeter of the truck body to allow the lift system to operate. A further problem is created when a loading dock is used. In such a case, the truck must be parked a precise distance from the loading dock in order for the lift system, in mid-stroke, to pick up a waste paper container from the loading dock.

Yet a further problem of paper shredding systems is generation of unwanted dust. While creating dust during paper shredding is inevitable, the creation of dust can be controlled. In known systems, dust is created due to shredder blades beating on paper, or paper beating on paper, rather than blades shredding paper. In such circumstances, paper fibers are exposed and excessive dust is created. These problems result from, among other things, an extended paper path between the infeed of paper and the shredding apparatus, overfeed of paper into the shredding apparatus, a poorly designed shredder or, perhaps, a combination of these factors.

Overfeed and jamming of shredding apparatus can be another major problem. This can cause significant delays and, in a worst case, can cause motor burn out, which can result in still further delays, substantial costs associated with replacement equipment, and even lost business and associated lost revenues.

SUMMARY OF THE INVENTION

The present invention relates to a mobile paper shredding system transversely mounted on a truck bed. Generally, the shredding system is designed and configured to be compact and lightweight such that a smaller truck may transport and operate the system. The system enclosure is aluminum reinforced plastic and all parts are steel or aluminum except for the shafts and components of the mill and augers and associated bearings and support structure.

The mobile paper shredding system comprises a lift system, a first feed system, a shredder, a second feed system, and a storage container with a sliding wall to remove shredded paper, all of which are installed within a truck bed-mounted enclosure. The lift system is used to elevate and dump the contents of a waste paper container into an opening in the top of the enclosure above the first feed system. The first feed system delivers the waste paper to the shredding equipment, a hammer mill. The hammer mill shreds the waste paper when the paper is struck by rotating blades on the hammer mill shaft against a separator plate. The shredded paper, when properly reduced in size, passes through a screen comprising multiple two-inch diameter openings. The second feed system or packer then packs the shredded paper passing through the screen into a waste container at the rear of the enclosure through an access door. Once the rearward portion of the enclosure is filled to capacity, the load is transported to place for disposal, typically a recycling center. The shredded paper is removed from the enclosure by advancing a rolling wall towards the rear of the enclosure which forces the packed, shredded paper from the enclosure.

The lift system of the preferred embodiment is constructed from aluminum to decrease the weight of the unit. It is designed with a limited profile, fitting within a small space of the overall enclosure to further enhance the paper shredder system's adaptability to be used in confined areas. The lift system is designed to operate in three stages: lowering to street level; elevation of the paper container substantially vertically along the side of the truck, rather than in a fixed radius path; and dumping of the container into the infeed opening of the shredding system. This further enhances use in confined areas. In addition, the configuration of the lift arms allows any of the three stages to be operated independently. In this way, a paper container may be engaged directly off an elevated loading dock, rather than from street level, by implementing only the second and third stages of the lift system. The result is a more efficient and compact lift system.

A feed control system is designed to prevent overloading the hammer mill. A key parameter is ensuring that the output of the hammer mill is greater than the input of the first feed system. Maintaining this relationship increases the capacity of the system by guaranteeing efficient operation of the hammer mill. In this regard, the feed control system employs a monitoring and feedback system to prevent overloading the hammer mill. More specifically, the rotational speed of the hammer mill is directly monitored. If the revolutions per minute of the hammer mill fall below a threshold amount, for example, 1800 rpms, a switch is triggered which stops the paper infeed—the first feed system. Stopping the first feed system allows the hammer mill to shred a sufficient amount of paper to decrease strain on the motor. Once the overfeed is eliminated and the rotational speed of the hammer mill surpasses the threshold, the monitoring system restarts the first feed system and paper processing continues uninterrupted.

The hammer mill is mounted transverse to the truck bed. In the preferred embodiment, the working length of the hammer mill is approximately 46 inches, significantly longer than the known art. It includes 15 discs spaced equally along the length of the mill shaft. Each disc has four blades spaced equally around the circumference of the disc on alternating sides of the disc. The longer mill length increases the volume of paper that can be processed without sacrificing storage capacity. The longer length also helps reduce dust produced during operation because lower feed speeds can be maintained while processing an equivalent amount of paper. The blade width dimension (¼ inches) is reduced from prior mill systems known to the inventor. This narrow profile results in improved shredding and less beating of the paper by the blades, and hence, less dust production.

The orientation of the first feed system to the hammer mill also improves performance. As configured, the first feed system delivers paper directly to the hammer mill, without an extended paper path. The paper exits the first feed system directly into the contact region between the mill blades and the separator fingers. The paper is promptly shredded when forced between the mill blades and the separator fingers. The close spatial relationship between the first feed system and the hammer mill ensures the paper is shredded only by metal to paper contact. In the prior art known to the inventor, where the feed mechanism is separated from the hammer mill by an extended distance, the volume of waste paper can increase, causing more paper on paper contact. This can cause much of the paper's fiber to be broken down and create significant dust. Excessive dust is undesirable since many recyclers will reject dusty loads due to health hazards of paper dust inhalation. Excessive dust also can foul mechanical systems and requires constant cleaning to maintain the systems in proper operating conditions.

The second feed system or packer is a modified version of a silage (bag) packer. The packer component has been adapted from the silage packer to include a comb with wedges. The packer is also mounted transverse to the truck bed and, in the preferred embodiment, its length matches the length of the hammer mill. The blades of the packer are staggered through a 360 degree configuration around the packer to enhance processing of shredded paper without jamming. The staggered blades rotate through the gaps between fingers of a comb member. Wedges assist in stripping paper away to prevent jamming of the blades in the comb fingers. Both the blade and wedges may include serrations on the paper contact surface to improve paper handling, including packing the shredded paper more densely.

A wetting system may also be included as part of the packer to increase density of packed paper and to reduce dust. In this regard, water is added to the trough formed at the bottom of the packer. As the blades of the packer rotate and move shredded paper through the water, the paper absorbs the water, allowing it to be packed more densely and causing dust to adhere to the shredded paper. As an additional benefit, the water reservoir used to supply water to the trough is also available to supply water to a sprinkler system in the unlikely event a fire is started somewhere within the housing.

A moving wall (or unloading wall) is constructed of aluminum with an access door adjacent to the packer. The storage area of the enclosure is unloaded by advancing the moving wall towards the rear of the truck thereby forcing the packed, shredded paper from the enclosure. The moving wall is provided with wheel-like rollers which ride along rails mounted on the truck bed. The moving wall may be guided by bearings which travel within grooves mounted in the compartment walls. The moving wall is advanced by an electric motor powered shaft and gear which is connected to the moving wall.

The design of the mobile paper shredding system, as described above, may be mounted on the bed of a 26,000 pound truck with a bed length of 20 feet. The size of the truck, again, lends itself to better maneuverability within constrictive areas, such as urban alleys and loading docks. Additionally, the smaller truck size permits operation of the truck and system without a Commercial Drivers License. The above system is capable of shredding up to 8,000 pounds per hour of paper.

The shredder system is housed within approximately the front five feet of the enclosure, leaving approximately fifteen feet of the enclosure for containing the shredded paper. Access doors are provided at various locations on the enclosure. One is located adjacent to the shredding system and power train for the shredding system on the driver's side of the enclosure. Another is located rearward of the moving wall when the moving wall is in its forward most position, also on the drivers side of the enclosure. These enclosures allow the operator or other maintenance personnel access to essentially all areas of the system to perform any necessary work. The rear of the enclosure comprises double doors that allow the shredded paper to be removed.

BRIEF DESCRIPTION OF THE DRAWINGS

For a more complete understanding of this invention, one should now refer to the embodiments illustrated in greater detail in the accompanying drawings and described below by way of example of the invention.

FIG. 1 is a top perspective view of the mobile paper shredder system of the present invention;

FIG. 2 is a side elevation view of the mobile paper shredder system of the present invention;

FIG. 3 is a front elevation view of the lift assembly of the present invention;

FIG. 4A is a cross-sectional view of the lift assembly of FIG. 3, taken along line 4—4 on FIG. 3, shown lowered to lift a container from dock level;

FIG. 4B is a cross-sectional view of the lift assembly of FIG. 3, taken along line 4—4 on FIG. 3, shown in position with the lift bracket and four bar linkage assembly retracted;

FIG. 4C is a cross-sectional view of the lift assembly of FIG. 3, taken along line 4—4 on FIG. 3, shown with a container lifted to maximum height;

FIG. 4D is a cross-sectional view of the lift assembly of FIG. 3, taken along line 4—4 on FIG. 3, shown in position to dump the contents of the container;

FIG. 5 is a side elevation view of the carriage of the present invention;

FIG. 6 is a top plan view of the carriage shown in FIG. 5;

FIG. 7 is a partial, top perspective view of one embodiment of the first feed, shredder, and second feed of the present invention;

FIG. 8 is an elevation view of the paper shredder system of the present invention as viewed along line 8—8 of FIG. 2;

FIG. 9 is a side elevation of the drive system for the paper shredder system of the present invention as viewed along line 9—9 of FIG. 8;

FIG. 10 is a side elevation view of the paper shredder system of the present invention showing an alternative first feed system, a shredder, and a second feed system;

FIG. 11 is a top plan view of the first feed system depicted in FIG. 10 of the present invention;

FIG. 12 is a side elevation view of the paper shredder system of the present invention showing a third alternative first feed system, a shredder, and a second alternative feed system;

FIG. 13 is a side elevation view of the alternative embodiment of the first feed system shown in FIG. 12;

FIG. 14 is an end view of the first feed system shown in FIG. 13;

FIG. 15 is a side elevation view of one embodiment of the shredder of the present invention;

FIG. 16 is a end view of the shredder shown in FIG. 15;

FIG. 17 is top plan view of one embodiment of the separator plate of the present invention;

FIG. 18 is an end view of the separator plate shown if FIG. 17;

FIG. 19 is a top plan view of one embodiment of the screen of the present invention;

FIG. 20 is a side elevation view of one embodiment of the packer and packer comb of the present invention;

FIG. 21 is a schematic view of one embodiment of the orientation of blades along the packer;

FIG. 22 is a top plan view one embodiment of the packer comb of the present invention;

FIG. 23 is an enlarged side elevation view of one embodiment of the packer comb fingers and wedge of the present invention;

FIG. 24 is a side elevation view of the alternative embodiment of the second feed system shown in FIG. 12;

FIG. 25 is an end view of the second feed system shown in FIG. 24;

FIG. 26 is a top plan view of the drive system of the present invention as viewed along line 26—26 of FIG. 9;

FIG. 28 is a top plan view of the moving wall drive system as viewed along line 28—28 of FIG. 2; and FIG. 29 is an end view of the rail and rack and pinion of the moving wall, as viewed along line 29—29 of FIG. 28.

Figure 27:
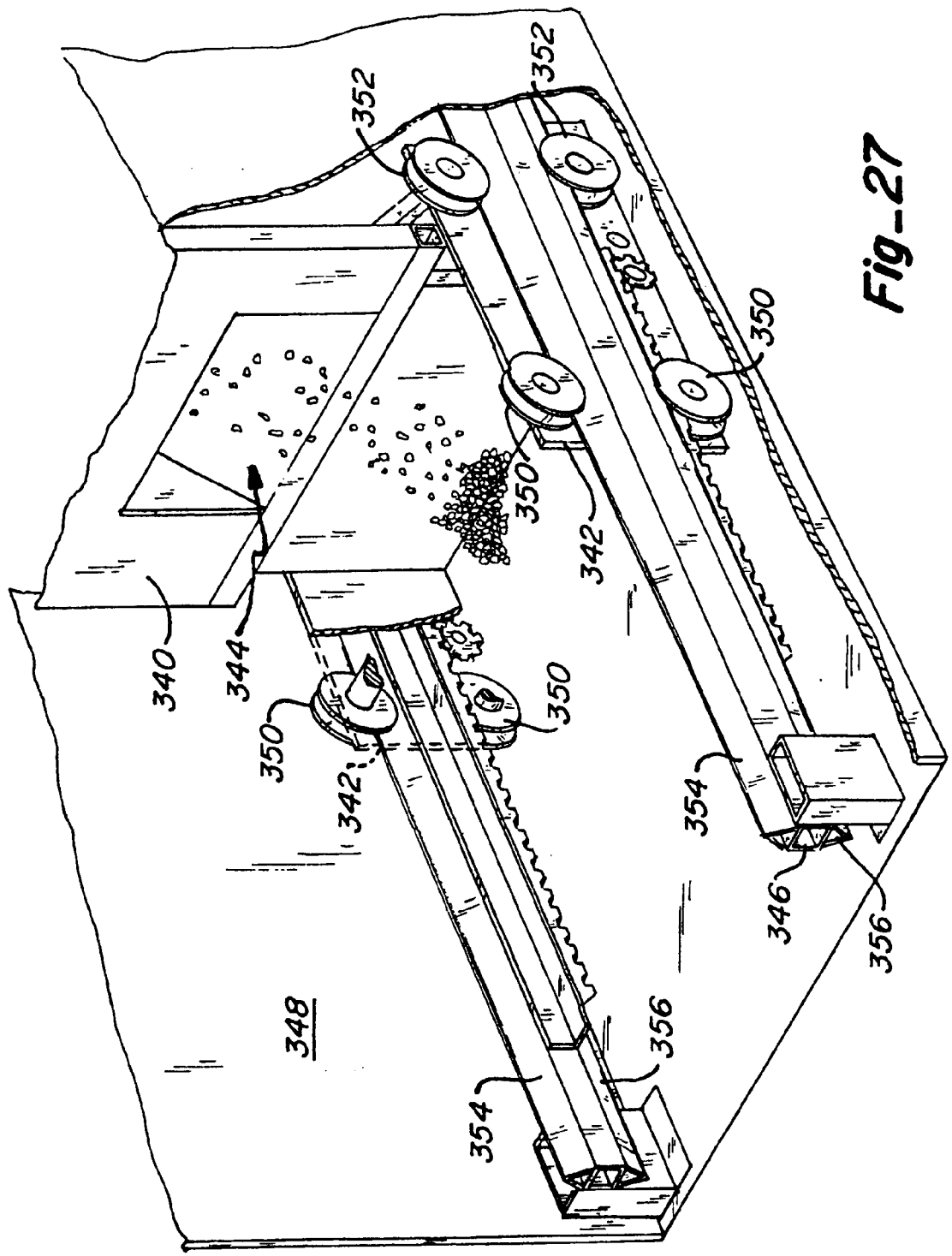
FIG. 27 is a perspective view of one embodiment of the moving wall and the corresponding rails of the present invention.

While the following disclosure describes the invention in connection with one or more embodiments, one should understand that the invention is not limited to these embodiments. Furthermore, one should understand that the drawings are not necessarily to scale and that graphic symbols, diagrammatic representations and fragmentary views, in part, may illustrate the embodiments. In certain instances, the disclosure may not include details which are not necessary for an understanding of the present invention, such as conventional details of fabrication and assembly.

DETAILED DESCRIPTION

Turning to FIGS. 1 and 2, the mobile paper shredding system 10 of the present invention is shown mounted on a truck bed 12. The preferred embodiment of the invention comprises six primary elements. These are a lift assembly 14, a hopper or paper input 16, a rotary first feed system 18, a rotary shredder 20, a second rotary feed system 22, and a storage compartment 24 for storing shredded paper which includes a moving or unloading wall 26 to remove the shredded paper from the storage compartment. An aluminum housing 28 comprises the storage compartment and also encloses the shredding and paper handling equipment. An access door on the opposite side of the truck (not shown) allows entry to the power train and drive components of the feed and shredding systems. A second access door 30 allows access to the storage compartment 24. A third access door or panel 32, disposed in the roof of the housing 28, allows access to the paper input 16. One of skill in the art should appreciate that access doors can be located at other locations as well.

Turning to FIGS. 3 and 4, the lift assembly 14 is shown in greater detail. In the preferred embodiment shown, the assembly fits within a recess 34 in the housing 28, providing a streamlined configuration and enhancing maneuverability of the vehicle in confined spaces. In the case of the preferred embodiment shown, the recess is approximately 15 inches deep and 30 inches wide. As illustrated in FIGS. 4A–4D, the lift system 14 is designed to operate in three stages: raising a paper container from street level or from a loading dock to a position adjacent the lower part of the housing 28 (FIGS. 4A, 4B); elevating the paper container vertically adjacent the housing (FIG. 4C); and, pivoting the paper container to empty its contents into the hopper or paper input 16 of the shredding system (FIG. 4D). The stages can operate independently, for example, the operator could use stages two and three only. The lift system 14 of the present invention offers at least two advantages over known lift systems. First, the lift system can lift paper containers not only from street level, but also from a loading dock without having to adjust the position of the truck relative to the loading dock. Second, the paper container moves in a substantially vertical path adjacent to the body of the truck, rather than in a fixed radius path from the ground to the paper input 16.

The lift system 14 of the preferred embodiment generally comprises a lift bracket 36 for securing a waste paper container, a four bar linkage assembly 38 for deploying the lift bracket 36 and for positioning the waste paper container adjacent the lower portion of the housing 28, a sled or carriage 40 and complementary set of rails 42 for vertically raising and lowering the waste paper container adjacent the housing 28, and a pivot assembly 44 for rotating the waste paper container to empty its content of waste paper into the paper input or hopper 16 of the shredding system. The carriage 42 and rails 44 are shown independent of the other components of the list assembly 14, in FIGS. 5 and 6.

In more detail, the lift bracket of the preferred embodiment comprises two vertical support members 46, and two horizontal support members 48, 50. Four equally spaced lift fingers 52 are mounted across the top horizontal support member 48. The lift fingers 52 are designed to fit securely underneath the lip of a waste paper container for purposes of lifting the container.

As seen in FIGS. 4A, 4B, a four bar linkage assembly 38, comprising bars 54, 56, 58 and 60, are pivotally attached to the lift bracket 36 at one end. The opposite ends of the bars 54, 56, 58 and 60 are pivotally attached to the lower end of two lift pawls 62, 64. A hydraulic cylinder 66 is mounted between the two lift pawls 62, 64 and its drive rod 68 is attached to a horizontal support bar 70 which extends between the two lower bars 58 and 60 of the four bar linkage assembly. In the preferred embodiment, the hydraulic cylinder has a 2 inch diameter drive rod 68 with a 14 inch stroke, such as a Model 42014 manufactured by Prince Mfg. Co. of Sioux City, Iowa. In operation, the hydraulic cylinder 66 extends drive rod 68 to deploy the lift bracket 36 from a stowed position to its lower most position (see generally FIG. 4A). On its retraction stroke, the drive rod 68 lifts the waste paper container from the ground or a loading dock to a position adjacent the side wall of the housing (see FIG. 4B).

As seen in FIGS. 5 and 6, the two lift pawls 62, 64 are pivotally mounted about pivot plate 72 at the upper end to a carriage 40. The carriage 40 comprises three horizontal members 74, 76, 78 and two vertical members 80, 82. A pair of rollers 84 vertical members are seated in the "C" shaped rails 42, which are mounted to the inside vertical corners of recess 34. The upper ends of vertical members 80, 82 attach to a pair of cables 86 which run to a pulley assembly 88 inside the housing 28. The pulley assembly is attached to a second hydraulic cylinder 90. The drive rod 92 of this second cylinder 90 causes the cable 86 to move the carriage 40 along the rails 42 between a lower position, seen in FIG. 4B, and an upper position adjacent the top of the housing 28 and the paper input 16 (FIG. 4C). In the preferred embodiment, the hydraulic cylinder 90 has a 3 inch drive rod 92 with a 24 inch stroke, such as Model 43024 manufactured by Prince Mfg. Co. of Sioux City, Iowa. The pulley assembly 88 is configured to provide a beneficial one-to-two ratio of movement between the stroke of the drive rod 92 and linear movement of carriage 40.

As seen in FIGS. 4A–4C, a horizontally disposed securement plate 94 and support rod 96 are attached to the upper most ends of the lift pawls 62, 64. The securement plate 94 is positioned to engage the upper edge of waste paper container W as the waste container is brought into a position adjacent the housing 28 at the end of stage one, i.e. as the retraction stroke of drive rod 68 is finishing (see FIG. 4B). Thus, the paper container is securely restrained between lift fingers 52 and securement plate 94 during the second and third stages of movement of the lift assembly 14.

As seen in FIGS. 4B, 4C, a pair of push rods 98 are attached to the lateral ends of the horizontal support rod 96. At the end of stage two, the push rods 98 engage arms 100 extending from the cover 32 of paper input 16 to open the cover 32. The cover 32 is pivotally mounted to the roof of the housing 28 and pivots to an open position as the carriage 40 moves to its upper most position.

In the third stage of movement, as shown in FIG. 4D, the waste paper container W is pivoted and its contents are emptied into the paper input 16 of the shredding system. The pivoting action is accomplished by a third hydraulic cylinder 102. The drive rod 104 extends and causes the lift pawls 62, 64 to rotate about pivot points 106. In doing so, the four bar linkage assembly 38, lift bracket 36 and paper container W all rotate. In the preferred embodiment, the hydraulic cylinder 102 has a drive rod 104 with an 8 inch stroke, such as Model 42008 manufactured by Prince Mfg. Co. of Sioux City, Iowa. In this embodiment, the paper container W rotates approximately 117 degrees beyond its upright position.

It should be understood to those of skill in the art that rather than using a single lift system 14, the present invention could utilize dual, independent lift assemblies. These separate lift assemblies could be positioned side by side and utilized simultaneously or sequentially. It should also be understood that even though the preferred embodiment of the lift assembly uses hydraulic cylinders, it can also be operated with pneumatics or electronic actuation.

Turning to FIGS. 2, 7 and 8, a first feed system 18, hammer mill 20 and a second feed system 22 are generally depicted. A hopper or paper input 16 disposed on the top of the housing 28 receives paper from a paper container W positioned by the lift system 14 adjacent the opening 16. As shown in FIG. 7, the first feed system 18 of the preferred embodiment comprises a rotary paddle arm 120 mounted transverse to the truck bed. In this figure, the paddle 120 rotates clockwise. The paddle arm 120 is made from ¼ inch steel, is approximately 47 inches long and extends radially from the central shaft 122 approximately 11 inches. The central shaft 122 is rotatably mounted to a support frame 124 in bearings 126. Paper is fed to the rotary paddle arm 120 by an inclined surface 126. In the preferred embodiment, the surface is inclined at an angle of 30 degrees. As seen in FIGS. 8 and 9, motor 128 powers the rotation of paddle arm 120. The motor 128 is attached to a reduction gear box 130 which, in turn, is connected to a 90 degree angle drive 132. A 3 inch diameter sprocket 134 is attached to the shaft 136 of the angle drive 132 and is connected to a 14 inch diameter sprocket 138 affixed to the shaft 122 of the paddle arm 120 by a toothed belt 140. In the preferred embodiment, the motor 128 is a ⅓ horse power, three-phase motor, such as Model 5K42FN4035 manufactured by General Electric Co. The gear box 130 is a reduction planetary gear box with a reduction of 5:1, such as Model 001 manufactured by Boston Gear, Inc. of Boston, Mass. The angle drive 90 has a reduction of 100:1, such as model 82206MQ56, manufactured by Ohio Gear, Inc. of South Carolina. Using this configuration, the paddle arm 120 of the preferred embodiment rotates one revolution per minute.

Alternatively, as illustrated in FIGS. 10 and 11, the first feed system 18 may comprise a rotary tub arrangement 150. This includes a bin or tub 152 which receives paper from the paper input 16. It includes a paper push bar 154 mounted to the inside wall 156 of the tub 152 across its diameter. The inside wall 156 of the tub 152 is funnel shaped below the push bar 154 to assist in advancing paper to an opening 158 in the bottom of the tub 152. The opening is positioned above the shredding system 20. In the preferred embodiment, the tub 152 is 7 feet in diameter and 2 feet high. The tub 152 sits in a cylindrical base 160 and further includes a plurality of equally spaced rollers 162 mounted to the bottom to facilitate rotation of the tub 152. Rotation is imparted to the tub 152 by a drive wheel 164 in frictional engagement with the outer surface 166 of the cylindrical base 160. The drive wheel may be powered by a ⅓ horsepower electric motor 168, such as the model used to drive the paddle arm 120. An opposing roller 170 is positioned opposite the drive wheel 164, in engagement with the inside surface 172 of the cylindrical base (see FIG. 10). Preferably, the tub 152 rotates two to three times per minute.

As a third alternative embodiment, shown in FIGS. 12–14, the first feed system 18 may comprise a plurality of equally spaced feeder blades 180 on a central shaft 182, which is attached to the support frame 124 of the shredding system by mounts 184. The mounts include bearings 186 which allow the shaft 182 and blades 180 to rotate. A side profile of the feeder blade 180 is shown in FIG. 14. In this embodiment, the feeder blades 180 are positioned approximately 2½ inches apart and are manufactured from one inch hydraulic 6 braid line, hoses and fittings. The central shaft 182 be powered in the same way as the embodiment utilizing the paddle arm 120.

Turning to FIGS. 7–9, 15 and 16, the preferred embodiment of the shredding equipment is shown. The shredder 18 comprises a hammer mill 200. The hammer mill 200 is also mounted transverse to the truck bed and closely adjacent the output of the first feed system 18. The hammer mill 200 comprises 15 discs 202, equally spaced approximately 3 inches apart on a central shaft 204. The hammer mill 200 of the preferred embodiment is approximately 46 inches long. The central shaft 204 rotates in pier bearings 206 mounted to the frame 124 of the shredding system. Four support rods 208 spaced 90 degrees apart extend through each of the 15 discs 202. Four hammers or blades 210 are attached to each disc 90 degrees apart and on alternating sides of the discs 202. The hammers or blades 210 are made from ¼ inch thick steel stock and are approximately 2½ inches by 7¼ inches in width and length, respectively.

The hammer mill 200 shreds paper by interaction with a separator plate 212. The separator plate 212 is mounted adjacent the hammer mill 200 at the output area of the first feed system 18. The separator plate 212 has a series of separator fingers 214 as seen in FIGS. 7, 17 and 18, angled at a 25 degree inclination below horizontal. The hammers 210 are positioned to rotate counterclockwise in the spaces 216 between the separator fingers 214. As the hammers 210 rotate, paper fed from the paddle arm 120 is shredded when forced between the hammer mill blades 210 and the separator fingers 214. The narrow profile of the blades 210 results in less beating of the paper by the blades and therefore less dust production.

To prevent jamming and to maintain a high volume of paper throughput, in the preferred embodiment the hammer mill 200 is positioned closely adjacent or proximate the paddle arm 120 of the first feed system 18 and rotational speed of the hammer mill 200 is monitored. By being in close proximity, there is no room for paper to accumulate between the paddle arm 120 and the hammer mill 200. By monitoring the rotational speed of the hammer mill 200, if the rate of rotation, or rpms, decreases below a predetermined amount, such as 1800 rpms, a switch will be triggered to shut down the operation of the paddle arm 120 to stop infeed of paper into the hammer mill 200. In this manner, the hammer mill 200 can continue shredding paper without additional infeed and thereby overcome any overfeed before incurring damage to the drive motor. Once the rate of rotation of the hammer mill returns to or exceeds the predetermined or threshold level, the paddle arm 120 will restart and continue paper feed operations. In addition, by monitoring the hammer mill 200 transverse to the truck body, a larger, more powerful hammer mill can be utilized than in known prior art shredders. Each of the foregoing solutions helps prevent overfeed and motor burnout. By combining all three solutions, the overall shredding system of the present invention is more efficient and can process a greater volume of paper.

As also shown in FIGS. 2, 7, 9, 10 and 12, the hammer mill is substantially surrounded by a filter or screen 218. The screen 218 is also depicted in two dimensions in FIG. 19. Screen 218 comprises an array of 2 inch diameter holes 220 which act to filter the shredded paper. Once the paper is shredded fine enough to pass through the screen 218, it passes through the screen into the second feed system 22 of the shredding system.

As paper passes through the screen 218, it falls directly on the packer mechanism 240, which is preferably positioned directly below the shredder, and rotates counterclockwise. The packer 240 is shown in FIGS. 2, 7, 8 and 20 in greater detail. As the packer 240 is dealing with much smaller sized paper than the first feed system, the preferred embodiment includes 30 blades 242 mounted in 60 degree intervals about a central shaft 244. A two-dimensional layout of the blades 242 is depicted in FIG. 21. The central shaft 244 turns in bearings 246 in the support frame 124. The length of the shaft 244 is preferably the same as, or longer than, the length of the hammer mill 200 and the packer 240 is also transversely mounted. The blades 242 are cut from one inch by 10 inch steel plate. As shown in FIGS. 12, 20, 22 and 23, a packer comb 248 assists in movement of the shredded paper into the storage area 24 by stripping the shredded paper from between the blades 242. The packer comb 248 comprises a body section 250 and comb fingers 252. Comb fingers 252 extend toward the center of the packer 240 in between the packer blades 242. The comb fingers 252 strip away shredded paper from between the blades 242 and assist in preventing paper jams. The comb fingers 252 and blades 242 may optionally contain serrations 254 on the surfaces which contact paper to assist in handling of the shredded paper. In the preferred embodiment, the body portions 256 between successive comb fingers 255 are angled at 30 degrees, see FIGS. 20, 23, to further assist in stripping shredded paper from the packer blades 242. As a further option, wedges 258 (see FIGS. 20, 22 and 23) are included on the underneath side of every other comb finger 252 to also assist in stripping paper from the packer blades and to prevent jamming. The wedges may also have serrations 260. In the preferred embodiment, the comb fingers are approximately 1 inch wide, about 8½ inches long, and are separated by a 1 inch gap.

Alternatively, as shown in FIGS. 12, 24 and 25, the second feed system 22 may comprise a series of 30 dual edged blades 262 mounted for rotation on a shaft 264. The shaft 264 is secured to the frame 124 and rotates in bearings 266. In this embodiment, the blades would be cut from 1 inch steel plate, would be approximately 22 inches long and would be equally spaced by approximately 1¼ inches along the shaft 264.

A paper passageway or trough 270 is formed below the packer 240 and extends upwardly into the storage area 24. The packer pushes shredded paper along the passageway 270 where it empties into the storage area 24.

The power or drive train for the hammer mill 200 and packer 240 is shown in FIGS. 8, 9 and 26. Power is received from the truck engine drive train. An angle drive 300 and a five groove pulley 302 are attached to the power takeoff 304 from the truck engine. The five groove pulley 302 turns a second five groove pulley 306 affixed to the end of a jack shaft 308, mounted on the support frame 124, by means of a belt 310 incorporating the two pulleys 302, 306. The jack shaft 308, in turn, imparts rotation to two additional groove pulleys 312, 314 disposed at the opposite end of the jack shaft 308. In the preferred embodiment, the inside pulley 312, is a five groove 8½ inch diameter pulley, and is connected to another five groove 8½ inch pulley 316 affixed to the end of the central shaft 204 of the hammer mill 200 by a belt 318. An adjustably positioned tension roller 320 is affixed to the support frame and allows the tension in belt 318 to be adjusted.

In the preferred embodiment, pulley 314 is a three groove 8½ inch diameter pulley. Pulley 314 is connected to a three groove 24 inch diameter pulley 322 affixed to the end of the shaft 244 of the packer 240 by a belt 324. These pulleys 314 and 322 provide a 3:1 reduction in revolutions per minute between the jack shaft 308 and the 24 inch three groove pulley 322. A 25:1 reduction gear box 326 is disposed between the 24 inch pulley 322 and the central shaft 244, providing an overall reduction in revolutions per minute of 75:1. Thus, in the preferred embodiment with the truck engine running at 1800 rpms, the packer will rotate at about 24 revolutions per minute.

Turning to FIGS. 2 and 27, a moving or paper unloading wall 26 is shown. The moving wall 26 functions to remove the shredded paper from the storage area 24. In general terms, the moving wall 26 includes a vertical wall portion 340 and a base structure 342. Integrated within the wall 26 is an opening 344 that aligns with the paper chute or passageway 270 exiting the second feed system 22. The opening 344 allows the shredded paper existing the packer 240 via the passageway 270 to enter the storage area 24 through the opening 344 in the wall 26.

The wall 26 moves within the storage area along a pair of rails 346 mounted to the bed of the truck along the outside walls 348. The lateral ends of the base structure 342, along the walls 348, include two pair of opposed guide rollers 350, 352 mounted to the base structure 342 to engage the upper and lower surfaces 354, 356 of the guide rails 346. The opposed guide rollers 350, 352 provide stability to the wall 26.

Movement of the wall 26 is powered by an electric motor 358 positioned within the base structure 342 underneath the passageway 270 (see FIG. 28). A gear box 360 is directly connected to the motor 358 and a drive shaft 362 extends laterally from the gear box 360 to the side walls 364 of the base structure 342. The drive shaft 362 is rotatably mounted to the base structure 342 by bearings mounted in the base structure (not shown). In the preferred embodiment, the motor 358 is a 3 horsepower motor, and the gear box 360 is a reduction gear box with a 50:1 ratio, such as Model 192B, Series 2000 manufactured by Emerson, division of U.S. Electric Motor Co. of St. Louis, Mo.

A drive gear 366 is mounted to each end of the drive shaft 362, along the inside wall 364 of the base structure 342. The drive gears 366 engage passive gears 368, respectively. Passive gears 368 are mounted to a rotating shaft 370 that extends through the wall 364 of the base structure. A pinion gear 372 is mounted to the opposite end of the shaft 370 on the outside of the base structure. Drive gears 366 are the same size as passive gears 368. There is a 3:1 reduction in size between passive gears 368 and pinion gears 372. Thus, in the preferred embodiment, there is a reduction of 75:1 between the revolutions of the electric motor 358 and the pinion gears 372. The pinion gears 372, in turn, engage gear racks 374 mounted along the inside of rails 346. As seen in FIGS. 27, 29, the rack gear 374 is mounted to a bracket 376 facing down to reduce the possibility of paper jams. Thus, in operation, the electric motor 358, through a reduction of 75:1, drives the pinion gears 372 along racks 374 to move the wall 26 from a fully recessed position adjacent the shredding equipment to a fully extended position adjacent the rear doors 378 of the storage container 24. In this configuration, 25,000 pounds of push can be exerted by the wall 26 on the volume of shredded paper stored in the container. As seen in FIG. 2, the lower portion 380 of the leading edge of the wall 26 may be inclined to assist in removing shredded paper from the storage container 24.

As an optional feature, limit switches, not shown, may be installed at both ends of the rack gear 374 to turn off the motor 358 and stop movement of the wall 26. The rails 346 are configured to terminate at the point of the limit switch to derail the wall 26 should the limit switches fail.

A further feature of the present invention is a wetting system to facilitate dense packing of the shredded paper and dust suppression. As seen in FIG. 2, a water reservoir 400 is mounted within the housing 28 at an elevated location to supply water, or some other appropriate liquid, by gravity to the low point of the paper passageway 270 of the paper path beneath the packer 240. A nozzle or other opening 402 is provided in the frame 124 in order to supply water directly into the passageway 270 via a supply line 404 from the reservoir 400. In the preferred embodiment, a depth of water would be maintained in the passageway 270 at a level of approximately 1 to 2 inches. In this manner, as the shredded paper passes through the passageway 270 under the force of the packer 240, it would pass through the water and would be wetted. Wetted paper packs more densely, allowing the storage container 24 to hold more paper, and it also causes dust to adhere to the paper, thereby reducing dust. The water level could be maintained by one of many ways known to persons of skill in the art, including a constant flow tied to operation of the shredding equipment, i.e., when the shredding equipment and packer are running, a valve is open to allow water to flow in a controlled manner into the passageway 270. Conversely, turning off the shredder and packer would close the supply valve and halt the flow of water. Alternatively, a sensor can monitor the level of water in the passageway 270 and operate a valve to add water when the level falls below a threshold amount.

An additional advantage provided by the reservoir 400 is fire protection. The reservoir 400 can also be used as a source of water for a sprinkler system should a fire be initiated within the equipment or storage areas. Nozzles appropriately located can be activated by the operator in the event of a fire.

While various embodiments have been shown and described, it will be apparent that other modifications, alterations and variations may be made by or will occur to those skilled in the art to which this invention pertains, particularly upon consideration of the foregoing teachings. For example, the present invention could be utilized on larger trucks where space and maneuverability are not a concern. Alternatively, the shredding system of the present invention could be placed on trailers of various sizes and pulled by trucks or other suitable vehicles.

It is therefore contemplated that the present invention is not limited to the embodiments shown or described, as such modifications and other embodiments as incorporate those features which constitute the essential functions of the invention are considered equivalent and within the true spirit and scope of the present invention.

What is claimed is:

1. A mobile paper shredder system, comprising:
   a. A housing, said housing having a length and a width, with the length greater than the width;
   b. a paper input disposed in said housing for receiving paper to be shredded;
   c. a lift apparatus positioned proximate said housing and adapted to lift containers of paper to a position adjacent said paper input;
   d. a first paper feed mechanism disposed within said housing and in communication with said paper input, said first paper feed receiving paper through said paper input and advancing said paper into a shredder;
   e. a shredder disposed within said housing and transverse to the length of said housing, said shredder in communication with said first paper feed, said shredder receiving paper from said first paper feed and shredding said paper;
   f. a second paper feed disposed within said housing and transverse to the length of said housing, said second paper feed in communication with said shredder, said second paper feed receiving shredded paper from said shredder and advancing the shredded paper to a storage container;
   g. a storage container disposed within said housing, said storage container receiving shredded paper from said second paper feed and holding said shredded paper, said storage container further comprising a paper output and a removal mechanism for removing shredded paper from said storage container.

2. The mobile paper shredder of claim 1, wherein said shredder comprises a rotary shredder.

3. The mobile paper shredder of claim 2, wherein said rotary shredder comprises a hammer mill shredder.

4. The mobile paper shredder of claim 3, wherein said rotary paper feed is at least the same length as said hammer mill.

5. The mobile paper shredder of claim 4, wherein said rotary paper feed is separated from said hammer mill by a screen.

6. The mobile paper shredder of claim 3, wherein said hammer mill shredder is at least 46 inches long.

7. The mobile paper shredder of claim 3, wherein said hammer mill shredder comprises a plurality of discs, each comprising 4 blades spaced 90 degrees apart.

8. The mobile paper shredder of claim 7, wherein said blades are disposed on alternating sides of each of said discs.

9. The mobile paper shredder of claim 7, comprising at least 15 equally spaced discs.

10. The mobile paper shredder of claim 1, wherein said second paper feed comprises a rotary paper feed.

11. The mobile paper shredder of claim 10, wherein said rotary paper feed comprises a plurality of radially staggered blades.

12. The mobile paper shredder of claim 11, further comprising a plurality of fingers secured within said housing and positioned between said blades to inhibit paper from collecting between said blades.

13. The mobile paper shredder of claim 12, wherein said fingers form an integral comb member.

14. The mobile paper shredder of claim 12, wherein said blades have a curved leading edge.

15. The mobile paper shredding apparatus of claim 12, wherein said fingers are positioned at an angle relative to said blades.

16. The mobile paper shredding apparatus of claim 12, wherein said fingers have a proximal end and a distal end, with the distal end closer to the axis of rotation for said blades, and the fingers are tapered between the proximal end and distal ends.

17. The mobile paper shredder of claim 11, wherein said plurality of blades is at least 30.

18. The mobile paper shredder of claim 17, wherein groups of at least 3 blades are positioned every sixty degrees about the circumference of said rotary paper feed.

19. The mobile paper shredder of claim 1, further comprising a wetting zone disposed adjacent said second paper feed and having liquid supplied to it for wetting the shredded paper.

20. The mobile paper shredder of claim 19, further comprising a reservoir for storing liquid, and a fire suppressant system, wherein said reservoir supplies liquid to said fire suppression system and said wetting zone.

21. The mobile paper shredder of claim 1, wherein said lift apparatus comprises a lift bracket and slider, said lift bracket adapted to receive a waste paper container, said lift bracket connected to said slider mounted to said housing, said slider vertically movable between a first position adjacent the lower portion of the housing and a second position adjacent the upper portion of said housing and said paper input, and said lift bracket pivotable about said slider to empty the contents of the waste paper container into said paper input.

22. The mobile paper shredder of claim 21, further comprising an access door covering said paper input, a receiving member connected to said access door, and a push arm disposed on said slider, wherein said push arm contacts said receiving member and opens said access door as said slider moves from said first position to said second position.

23. The mobile paper shredder of claim 22 wherein said push arm is a telescoping arm.

24. The mobile paper shredder of claim 1, wherein said first feed system comprises a rotating feed member mounted transverse to said housing.

25. The mobile paper shredder of claim 24, wherein said rotating feed member comprises a paddle.

26. The mobile paper shredder of claim 24, wherein said rotating feed member comprises a plurality of blades mounted on a rotating shaft.

27. The mobile paper shredder of claim 26, wherein said plurality of blades is 15 equally spaced blades.

28. The mobile paper shredding device of claim 1, wherein said first feed system comprises a rotating tub disposed above said shredder, said rotating tub further comprising a push bar mounted across said tub to contact and move paper received in said tub from said paper input.

29. The mobile paper shredder of claim 1, further comprising a monitor in association with said first paper feed mechanism and adapted to halt said first paper feed mechanism if rotational speed of said paper feed mechanism falls below a threshold value and to reinitiate said first paper feed mechanism when the rotational speed exceeds a predetermined value.

30. The mobile paper shredding system of claim 1, further comprising a paper feed control system associated with said shredder and at least one of said first paper feed mechanism and said second paper feed, said paper feed control system monitoring said shredder and adjusting the paper feed to control paper feed into said shredder.

31. The mobile paper shredder of claim 30, wherein said first paper feed mechanism is adjusted to reduce paper feed into said shredder.

32. The mobile paper shredder of claim 30, wherein said second paper feed is adjusted to control paper feed away from said shredder.

33. A mobile paper shredder system, comprising:
a. A housing mounted on a vehicle;
b. a paper input disposed proximate the top of said housing for receiving paper to be shredded;
c. a lift apparatus mounted to said housing, said lift apparatus adapted to lift containers of paper substantially vertically along said housing from a first position proximate the bottom of said housing to a second position adjacent said paper input;
d. a first paper feed mechanism disposed within said housing and in communication with said paper input, said first paper feed receiving paper through said paper input and advancing said paper into a shredder;
e. a shredder disposed within said housing and transverse to the length of said housing, said shredder in communication with said first paper feed, said shredder receiving paper from said first paper feed and shredding said paper;
f. a second paper feed disposed within said housing and transverse to the length of said housing, said second paper feed in communication with said shredder, said second paper feed receiving shredded paper from said shredder and advancing the shredded paper to a storage container;
g. a storage container disposed within said housing, said storage container receiving shredded paper from said second paper feed and holding said shredded paper, said storage container further comprising a paper output and a removal mechanism for removing shredded paper from said storage container.

34. The mobile paper shredder of claim 33, wherein said vehicle is self propelled.

35. The mobile paper shredder of claim 33, wherein said vehicle is a truck and said housing is mounted on the bed of said truck.

36. The mobile paper shredder of claim 33, wherein said vehicle is a trailer.

37. The mobile paper shredder of claim 33, wherein said lift apparatus comprises a lift bracket and slider, said lift bracket adapted to receive a waste paper container, said lift bracket connected to said slider mounted to said housing, said slider vertically movable between a first position adjacent the lower portion of the housing and a second position adjacent the upper portion of said housing and said paper input, and said lift bracket pivotable about said slider to empty the contents of the waste paper container into said paper input.

38. A method of providing mobile paper shredding, comprising:
a. a first location, inputting paper to a first rotary paper feed system which advances paper to shredding equipment;
b. positioning rotary shredding equipment below and substantially proximate said paper feed system and shredding the paper received from said first paper feed system;
c. monitoring the shredding equipment to determine if a paper overfeed occurs, and stopping said first rotary paper feed if an overfeed of paper to the shredding equipment occurs and restarting said first rotary paper feed after the overfeed dissipate;
d. filtering the shredded paper and allowing shredded paper which is smaller than a predetermined size to advance to a second feed system;
e. positioning a second rotary feed system vertically below said shredding equipment, and providing said second feed system with a plurality of circumferentially staggered blades to advance the shredded paper to a storage area;
f. storing the shredded paper in the storage area;
g. at a second location, removing the shredded paper from said storage area.

39. The method of claim 38, further comprising the step of wetting the shredded paper.

40. The method of claim 38, said blades are positioned at least every sixty degrees around the circumference of said second rotary feed system.

41. The method of claim 38, wherein said shredding equipment is a rotary hammer mill.

42. The method of claim 38, further comprising lifting a paper container containing waste paper through a path that includes a vertical portion of travel, and rotating the container to empty its contents into said first rotary feed system.

43. The method of claim 38, wherein said first rotary feed system advances paper with a paddle.

44. The method of claim 38, wherein said first rotary feed system advances paper with a cylindrical tub.

45. In a mobile paper shredding apparatus having a housing mounted on a vehicle with the housing containing a first rotary feed system, rotary shredding equipment, a second rotary feed system and a storage area for shredded paper, the improvement comprising:
a lift system mounted to the external side wall of the vehicle, said lift system comprising a sled moveable along a pair of vertical rails mounted to said housing, said sled moveable between a first position proximate the lower portion of said housing and a second position adjacent the upper surface of said housing, a lift bracket mechanism mounted to said sled, said lift bracket mechanism being extendable from the external wall of said vehicle to engage a paper container, and a pivot mechanism mounted to said sled to rotate the paper container beyond horizontal to empty its contents into the first rotary feed system; and
mounting the first rotary feed system, rotary shredding equipment and second rotary feed system transverse to the longitudinal dimension of the vehicle.

46. The mobile paper shredder of claim 45, wherein said pivot mechanism comprises a hydraulic cylinder.

47. In a mobile paper shredding apparatus having a housing mounted on a vehicle with the housing containing rotary shredding equipment, a rotary paper feed system disposed downstream of said shredding equipment and a storage area for shredded paper, the improvement comprising: the rotary paper feed system comprising a plurality of blades circumferentially staggered along a rotating axis and fingers positioned between said blades to remove paper from between said blades.

48. The rotary paper feed system of claim 47, further comprising a wedge member disposed on at least a plurality of said fingers.

49. The rotary paper feed system of claim 47, wherein said blades have a curved leading edge.

50. The rotary paper feed system of claim 47, wherein said fingers have a first surface and a second surface, and said blades travel past said first surface before traveling past said second surface, and wherein said wedges are disposed on said first surface.

51. The paper feed system of claim 47, wherein said rotating axis is disposed transverse to the longitudinal axis of the vehicle.

52. A mobile paper shredding system comprising:
a. a housing, said housing having a length and a width, with the length greater than the width;

b. means for moving said housing from one location to another location;

c. paper input means disposed in said housing for receiving paper to be shredded;

d. first paper feed means disposed within said housing and in communication with said paper input means for receiving paper and advancing said paper into a shredding means;

e. shredding means disposed within said housing, said shredding means in communication with said first paper feed means and for receiving paper from said first paper feed means and shredding said paper;

f. second paper feed means disposed within said housing and in communication with said shredding means, said second paper feed means for receiving shredded paper and advancing the shredded paper to a storage container;

g. monitoring means for monitoring the shredding means and for initiating an adjustment in at least one of said first and second paper feed means;

h. a storage container disposed within said housing, said storage container receiving shredded paper from said second paper feed means and further comprising a paper output and removal means for removing shredded paper from said storage container.

53. In a mobile paper shredding apparatus having a housing mounted on a vehicle with the housing containing a first rotary feed system, rotary shredding equipment, a second rotary feed system and a storage area for shredded paper, the improvement comprising: mounting the first rotary feed system, rotary shredding equipment and second rotary feed system transverse to the longitudinal dimension of the vehicle, and the apparatus further comprising a monitoring system associated with the rotary shredding equipment to monitor the rotational speed of the shredding equipment, said monitoring equipment also in communication with the first rotary feed system and adapted to cause the first rotary feed system to stop if the rotational speed of the shredding equipment falls below a threshold value and to cause the first rotary feed system to restart when the rotational speed exceeds the predetermined value.

54. A mobile paper shredder system, comprising:

a. a housing, having a length and a width, with the length greater than the width;

b. a paper input disposed in said housing for receiving paper to be shredded;

c. means positioned proximate said housing for vertically lifting containers of paper to a position adjacent said paper input;

d. a first means for feeding paper disposed within said housing and in communication with said paper input, said first means for feeding paper receiving paper through said paper input and further advancing said paper;

e. a shredder disposed within said housing and transverse to the length of said housing, said shredder in communication with said first means for feeding paper, said shredder receiving paper from said first means for feeding paper and shredding said paper;

f. a second means for feeding paper disposed within said housing and transverse to the length of said housing, said second means for feeding paper in communication with said shredder, said second means for feeding paper receiving shredded paper from said shredder and further advancing the shredded paper;

g. a storage container disposed within said housing, said storage container receiving shredded paper from said second means for feeding paper and holding said shredded paper.

* * * * *